(12) United States Patent
Hung

(10) Patent No.: US 7,291,988 B2
(45) Date of Patent: Nov. 6, 2007

(54) ELECTRONIC HIGH INTENSITY DISCHARGE LAMP DRIVER

(76) Inventor: Fu-Ling Hung, 11311 Slater Ave., Fountain Valley, CA (US) 92708

( * ) Notice: Subject to any disclaimer, the term of this patent is extended or adjusted under 35 U.S.C. 154(b) by 0 days.

(21) Appl. No.: 11/197,883

(22) Filed: Aug. 5, 2005

(65) Prior Publication Data

US 2006/0038503 A1 Feb. 23, 2006

Related U.S. Application Data

(63) Continuation-in-part of application No. 10/692,427, filed on Oct. 22, 2003, now Pat. No. 7,038,396.

(51) Int. Cl.
*H05B 37/02* (2006.01)
*H05B 41/16* (2006.01)

(52) U.S. Cl. .................. 315/291; 315/200 R; 315/247; 315/360

(58) Field of Classification Search ................ 315/291, 315/360, 246, 247, 200 R, 85; 361/103, 361/104, 105, 106, 118, 124
See application file for complete search history.

(56) References Cited

U.S. PATENT DOCUMENTS

| 4,672,300 | A | * | 6/1987 | Harper | ................ | 323/222 |
| 5,327,048 | A | * | 7/1994 | Troy | ................ | 315/240 |
| 5,532,894 | A | * | 7/1996 | Sweaton | ................ | 361/18 |

* cited by examiner

*Primary Examiner*—Thuy Vinh Tran
(74) *Attorney, Agent, or Firm*—Charles C. H. Wu; Wu & Cheng, LLP

(57) ABSTRACT

A high intensity discharge (HID) driver for a HID lamp which can be used as a HID ballast is provided. The HID driver at least includes an input processor connected to an input power for suppressing a transient and in in-rush current of the input power, a main driver connected to the input processor and a HID lamp for driving and amplifying the input power; and a protection circuit connected to the main driver and the HID lamp for controlling a timing of starting after a failure condition. Moreover, the HID driver can further includes a timing circuit connected to the main driver for controlling a timing, and a starting circuit connected to the timing circuit and the HID lamp for starting the HID lamp. The HID driver can be applied to a high pressure sodium (HPS) lamp or a halide lamp (HML).

24 Claims, 24 Drawing Sheets

ELECTRONIC HIGH INTENSITY DISCHARGE LAMP DRIVER

This is a Continuation-in-Part patent application of application Ser. No. 10/692,427, filed Oct. 22, 2003 entitled "ELECTRONIC HIGH INTENSITY DISCHARGE LAMP DRIVER" which is now U.S. Pat. No. 7,038,396. The aforementioned application is hereby incorporated herein by reference.

BACKGROUND OF THE INVENTION

1. Field of the Invention

The invention relates in general to a ballast of a high intensity discharge (HID) lamp driver. More particularly, the invention relates to a high-efficiency electronic ballast with wide input voltage range, high power factor, low current total harmonic distortion (THD) and low current crest factor.

2. Description of Related Art

In the design of the circuit for driving a high intensity discharge (HID) lamp, the HID ballast is an important component of a HID lamp. The performance of the ballast directly affects the starting, the color temperature, the life period and the working stability of the HID lamp. The electronic HID ballast can overcome the disadvantages caused by the iron core HID ballast. Moreover, the ratio of the loading power transmission to the weight of the ballast is high, and the ratio of the power consumption to the controlled power is low. However, the disadvantages of the electronic HID ballast are that the starting of the electronic HID ballast is complex, the power control and the circuit protection are hard to design.

I. Basic Concept and Circuit of a Conventional Ballast of HID Lamp

In general, a conventional basic switching power supply can be classified into three types, one is a flyback and forward converter switching power supply, another is a push-pull switching power supply, and the other is a half bridge/full bridge switching power supply. First, the power loading of the flyback and forward converter switching power supply is small, and the duty cycle is only about 0.4. The use of the flyback and forward converter switching power supply in a HID ballast is described, for example, in the paper of E. Deng and S. Cuk, Single Stage High Power Factor Lamp Ballast, APEC'94, p. 441-449, 1994, wherein an electronic HID ballast used in a low power metal halide (MHL) is described. Secondly, the loading of the push-pull switching power supply is high, but it is seldom to be used as a HID ballast. Thirdly, the power loading of the half bridge/full bridge switching power supply is also high, and it is generally used as a variety of alternating current (AC) electronic ballast. Substantially, an electronic HID ballast may be constructed by a half bridge/full bridge switching power supply using a HID lamp as a load. FIG. 1 is a circuit diagram illustrating a conventional electronic HID ballast using a half bridge/full bridge switching power supply.

In general, an electronic HID ballast can drive the HID lamp in a high frequency range. Before the lamp is turned on, a voltage less than a maximum permissible voltage is provided to the lamp, wherein a pulse voltage is added to the voltage. In general, an open-circuit voltage of the electronic HID ballast has a quasi-square waveform with an over-pulse peak, and the voltage is used as a trigger pulse. FIG. 2 is a waveform diagram illustrating a quasi-square wave having an over-pulse peak as a trigger pulse of the HID lamp. It is noted that different lamp with different type and power has different quasi-square wave with different amplitude and width.

Moreover, the limitation of the HID lamp is that a higher cold-start voltage is required but after lamp is turned on, the hot lamp can not be started again in order to protect the lamp. Therefore, in order to make sure that the lamp can be turned on, a higher amplitude and a wider width of the pulse voltage is preferable. But in order to prolong the operating life of the lamp, the amplitude of the voltage is preferably as low as possible.

In conventional, there are two types of circuit design to provide the pulse voltage. One method is to obtain the pulse voltage from the resonance of the circuit. Another method is to obtain the pulse voltage from a special starting trigger device. For the method using the resonance of the circuit, referring to FIG. 1, a half bridge converter circuit is used an electronic HID ballast, wherein a high frequency square voltage output is obtained in both ends of the HID lamp. In general, the voltage U can be expanded by a Fourier series as illustrated in the following equation (1):

$$U = \sum_n^\infty u_n \sin\omega_n t \quad (1)$$

At the instance of the startup of a cold lamp, the circuit shown in FIG. 11 may be regarded as an open circuit. Moreover, since C>>Cj, the circuit can be simulated by a serial connected circuit RLC as shown in FIG. 3 (wherein R is calculated from the power loss of the circuit). The circuit can be solved by the following equation (2):

$$L\frac{dI}{dt} + \frac{1}{Cj}\int I dt + IR = \sum_n^\infty u_n \sin\omega_n t \quad (2)$$

or $$\frac{d^2 I}{dt^2} + \frac{R}{L}\frac{dI}{dt} + \frac{1}{LCj} = \sum_n^\infty \frac{u_n w_n}{L}\sin\omega_n t \quad (3)$$

When the damped oscillation is considered only, the current I can be expanded by the following equation (4):

$$I = \sum_n^\infty (a_n \sin\omega_n t + b_n \cos\omega_n t) \quad (4)$$

Therefore, by replacing the current I of equation (4) into equation (3) and using the normalization property of the trigonometric function, the equation (3) can be solved. Therefore, the desired resonance to the frequency $\omega_n$ of the circuit described by equation (3) is obtained by the following equation (5):

$$\omega_n^2 = \frac{1}{LCj} \quad (5)$$

Accordingly, in equation (3), when the resonance current is considered and other order harmonic wave currents are omitted, the resonance current Ir is approximated by the following equation (6):

$$Ir \approx I_n = \frac{u_n}{R}\sin\omega_n t \qquad (6)$$

The voltage V between both ends of the lamp is then equal to:

$$V = u_{Cj} = -u_L = -L\frac{dI}{dt} = \frac{Lu_n\omega_n}{R}\cos\omega_n t \qquad (7)$$

In a conventional fluorescent electronic ballast, the peak value Vmax of the voltage V between both ends of the lamp is obtained by using the resonance between the circuit loop and the basic resonance voltage (wherein n=1). Therefore, the peak value Vmax of the voltage is equal to:

$$Vmax = \frac{Lu_1\omega}{R} \qquad (8)$$

Accordingly, if the power loss R of the circuit is small enough, the starting voltage between both ends of the lamp is high enough. In fact, R is very small, thus the Vmax is much larger than the required voltage. Therefore, the loop of the circuit is designed a little far away from the resonance point of the circuit in order to prevent the Vmax from damaging the circuit by adjusting the capacitance Cj.

Conventionally, the above circuit as shown in FIG. 1 is used as an electronic HID ballast. However, the lamp may be damaged suddenly due to the over-pulse peak of the voltage. The reason why the voltage may damage the lamp may be found in the equations described above. According to equations (6) and (8), at the resonance point, the ratio of the maximum current Imax to the voltage Vmax is equal to:

$$\frac{Imax}{Vmax} = \frac{1}{n\omega_n L} \qquad (9)$$

When the power of the lamp is high, the voltage Vmax is high enough. When n=1, the ratio of equation (9) is equal to:

$$\frac{Imax}{Vmax} = \frac{1}{\omega L} \qquad (10)$$

In general, the voltage Vmax is about 1.2 kV. For a 150 W sodium lamp, Imax is about 15 A if ωL is about 80. However, for a 250 W sodium lamp, Imax is larger than about 20 A. Therefore, at the instance of the starting of the lamp, the high current may damage the lamp. If the starting fails, the over-pulse peak voltage will destroy the loop of the circuit or the lamp. Therefore, to provide the circuit shown in FIG. 1 as an electronic ballast of the HID lamp is not practical. Moreover, if the provided circuit is not in the basic resonance, for example, the resonance is in $3^{rd}$ order or $5^{th}$ order, the resonance current can be reduced. But the parameters of the circuit need to be adjusted to match the $3^{rd}$ or the $5^{th}$ order resonance condition. The adjustments of the parameters are dependent on the whole circuits and need to be optimized by try and error method. Moreover, the power consumption of the circuit will increased since it is proportional to the order of the resonance. Accordingly, the peak value of the voltage will reduce, and thus the opportunity of failure of the startup will increase.

II. The Conventional Startup Circuit for Triggering the HID Lamp

Hereinafter, a variety of conventional startup circuits for triggering the HID lamp will be described. FIG. 4 is a circuit diagram illustrating a conventional startup circuits for triggering the HID lamp of 4 times of voltage type. In early days, the circuit of FIG. 4 is provided as a iron core ballast or a so-called hot starter. FIG. 5 is a circuit diagram illustrating another conventional startup circuits for trigger the HID lamp. Referring to FIG. 5, however, the stability of the circuit and the operating life of the components of the circuit are also the issues of the circuit.

Moreover, the voltage curve from the startup to the stable working period of a conventional HID lamp is shown in FIG. 6. After the voltage of the lamp reach the working voltage, the current of the lamp must be stabilized at the working current, and the current in each period must be continuously. Moreover, in a half period of the voltage curve, two sub-zero voltages can not be occurred to prevent turning off of the arc of the lamp. Finally, no matter what the waveform of the voltage of the lamp is a sine wave, quasi-sine wave, square wave, quasi-square wave, and no matter what the waveform of the current of the lamp is a sine wave, square wave, saw wave or even a sharp peak wave, the wave peak coefficient should less than 1.8 times of that of the sharp peak wave.

Hereinafter, the generation and the influence of the sound resonance of the HID lamp will be described. The sound resonance issue is a special characteristic of the HID lamp. The sound resonance is caused by the standing wave formed by the superposition of the pressure waves reflected from the lamp tube, wherein the pressure wave is caused by the transmission of the high frequency electrical power in the ion plasma of discharged by the arc of the lamp. Therefore, the arc of the lamp will be influenced by the pressure wave of the sound resonance, and thus the arc and the voltage of the lamp will be unstable. Therefore, the light emitted from the arc of the lamp will flicker, more particularly, the arc of the lamp will be distorted or destroyed, and thus the lamp will be burned out or even the lamp tube will be blown up. Especially, when the discharge lamp tube is spherical, the shape of the lamp is symmetrical and the sound resonance is much easily to take place. In general, when the frequency of the current is in a range of about 10 KHz to about 300 KHz, the sound resonance may occur. As a research result, it is found that in a frequency less than 300 KHz, there is almost no frequency that can provide a stable working condition. Accordingly, in order to prevent the sound resonance issue described above, the following methods are provided. The first method is to operate the lamp in a frequency range far away from the sound resonance frequency. The second method is to add one or more proper low frequency component before the sound resonance occurs to prevent from generating of the sound resonance. The third method is to eliminate the band of frequency of the current of the lamp near the band of frequency of the sound resonance. Accordingly, a preferable method is to add one or more low frequency component to the high frequency current, or to turn on the lamp by using a DC current. Moreover, an external startup circuit and a corresponding protection circuit are also required in the methods described above.

III. Calibration of the Frequency Band of the Power

In general, the HID lamp with different type and different working power has their own stable working frequency band. If the frequency band is not suitable for the lamp, the sound resonance may occur, the arc may flicker, and in some specific frequency bands, the tube may burn out. Therefore, in order to operate the HID lamp in a stable high frequency working condition, the frequency band must be selected according to the type, the working power, the shape, and the gas pressure of the lamp. Moreover, the HID tube pressure has a specific dispersion characteristic, and the working power and the color temperature of the lamp will be effected by the dispersion characteristic. Therefore, the working power must be effectively controlled by the circuit of the ballast. Moreover, the harmonics of the input current of the HID electronic ballast will damage the HID lamp. Since the HID lamp is a non-linear electronic component, the power inverter is operated in a high frequency switching condition, thus the waveform of the input current will be distorted. The higher order harmonic wave can not be eliminated by one or more capacitors connected in parallel. The eliminating of the harmonic wave is generally corresponding to the increasing of the power factor. A power factor correction (PFC) IC may be provided as a PWM power control method, thus the power stability of the ballast and the lamp under different working voltage may be solved. However, for all the conventional PFC IC, the working voltage, the dynamic range and the loading power are limited. For example, FIG. 7 is the block diagram illustrating the circuit of MC34262 of Motorola, FIG. 8 is the block diagram illustrating the circuit of L4981A of ST, and FIG. 9 is the block diagram illustrating the UCC3817 of Texas Instrument (TI). Referring to FIG. 7, the MC34262 is worked in a range of 185V to 265V/250 W, but it is difficult to work in a range of 85V to 265 V/250 W. Therefore, ST developed the L4981A (shown in FIG. 8), wherein the IC can work in a range of 88V to 264V/200 W. In addition, TI developed the UCC3817 (shown in FIG. 9), wherein the dynamic range of the IC is in a range of about 85V to about 270V.

IV. Enhancement of the Driving Power

For all the conventional secondary half bridge power driver IC, the loading power are also limited. For example, FIG. 10 is the block diagram illustrating the circuit of L2155, L2156 or L2159 of IR, FIG. 11 is the block diagram illustrating the circuit of UCC3580 or 3895 of TI. These ICs can only be provided in a limited range of loading power. If the circuit peripheral to these ICs is modified to fit the HID lamp, the cost and the complexity of the circuits will increase. If other simple IC circuit, for example, the one shown in FIG. 12, is used to drive a lamp with power loading of 250W to 400W or even 1000W, the lamp and the IC will often be blown up on starting the lamp.

Alternatively, the circuit using the self-excited oscillation method can also be employed for enhancement of the driving power instead of using the ICs. However, the loading power of the circuit is also limited in a range, for example, below 150W. Although the loading power can be enhanced by using the method of increasing the area of the magnetic core, the stabilization of the power is still an issue. For example, if the power loading of the circuit is 150W, in general, the power will drop during the operation and finally maintain at about 120W. FIG. 13 is a block diagram illustrating another circuit of a conventional power drive circuit. It is noted that more than one inductor is provided in the circuit of FIG. 13. Accordingly, except for the stabilization of the power, the complexity and cost of the circuit are also another issue of the circuit.

Another method to enhance the driving power is to replace the power amplifier from the half bridge inverter to a full bridge inverter, and hence, the primary circuit needs to be changed according to the secondary circuit. Alternatively, a method of using capacitor as the voltage divider to enhance the power can also be provided instead of changing the half-bridge inverter, or even changing the electronic component of the current limit inductor.

V. Protection of the Circuit

In general, during the operation of the HID lamp and the ballast, some of the following problem may occur, for example, (1) The HID lamp is not electrically connected with the base of the lamp, thus the circuit between the lamp and the ballast is an open circuit.

(2) The lamp is deteriorated and can not be turned on, however, the ballast still applies high voltage pulses to the lamp in an effort to turn it on.

(3) The HID lamp is broken, or short.

(4) The power supply is broken suddenly and then is back on; even though the lamp is still hot and can not be turned on, the ballast continues to apply high voltage pulses to the lamp trying to start it.

Accordingly, if any one of the problems occurs, the lamp should not be started. However, if the ballast and the lamp are not protected by a protection circuit, the ballast will apply high voltage pulses to try to start the lamp when any one of the problem occurs. Thus, the ballast and the lamp will be damaged, the power consumption will increase, and the electromagnetic interference will also increased. Therefore, a protection circuit for the ballast and the lamp is required.

The protection circuit must be incorporated with the ballast and the lamp and provides the function such as to start the lamp after about 3 to 5 minutes. Therefore, the protection circuit must be controlled by a timing circuit. FIG. 14 is a block diagram illustrating a conventional protection circuit. Referring to FIG. 14, a voltage signal proportional to the resonance voltage is provided through the assistant coil of the current limit inductor. The voltage signal is filtered and rectified to be a DC sampling voltage, the DC sampling voltage is then divided and applied to the base-emitter of the protection transistor 1402. The collector of the transistor 1402 is connected to the triggering pole (leg 2) of the timing IC NE555. The IC NE555 is connected in a single stable state, the leg 6 and leg 7 of NE555 is connected to the timer RC, the output pole (leg 3) is connected to the enabling pole (leg 5) of power driving IC (CD4046). When a low voltage level is applied to the leg 5 of CD4046, CD4046 is normally operated, but when a high voltage level is applied to the leg 5 of CD4046, CD4046 is off. Accordingly, when a low level DC sampling voltage is applied to the transistor 1402, the transistor 1402 is off and NE555 is not triggered, a low voltage level is applied to the leg 3 of CD4046, thus CD4046 is normally operated. When some abnormal situation happens, the DC sampling voltage is increased drastically, the transistor is turned on and NE555 is triggered, a high voltage level is applied to the leg 3 of CD4046, thus CD4046 is off. Therefore, the circuit is protected. The protection time of the circuit is determined by the timer RC, in general, the protection time is set about 5 minutes in order to restart the lamp. Alternatively, the IC 2159 or IC 2156 of IR company can also be provided as the protection circuit. However, it is noted that a variety of the conventional protection circuit can not be directly provided as a protection circuit, but must be modified and incorporated with another external circuit to fit the protection requirement. Therefore, the cost and the complexity of the protection circuit is increased.

Accordingly, an electronic ballast for HID lamp at least including the power amplification, light adjusting, restarting, timing and protection circuits is required.

SUMMARY OF THE INVENTION

Accordingly, the present invention is to provide an electronic HID ballast for a HID lamp for a low power to middle and high power input to solve the problems generated in the conventional design of the ballast.

It is another object of the invention to provide an electronic HID ballast for a HID lamp at least including the power amplification, light adjusting, restarting, timing and protection circuits designed as a whole.

In order to achieve the above objects and other advantages of the present invention, a high intensity discharge (HID) driver for a HID lamp which can be used as a HID ballast is provided. The HID driver at least includes an input processor connected to an input power for suppressing a transient and an in-rush current of the input power, a main driver connected to the input processor and a HID lamp for driving and amplifying the input power; and a protection circuit connected to the main driver and the HID lamp for controlling the timing of starting after a failure condition.

In an embodiment of the invention, the HID driver can be applied to a high pressure sodium (HPS) lamp or a metal halide lamp (HML).

In an embodiment of the invention, the input power is an alternating current (AC) voltage in a range of about 85V to about 305V at 50 HZ/60 Hz.

In an embodiment of the invention, the HID driver may further include a timing circuit connected to the main driver for controlling a timing, and a starting circuit connected to the timing circuit and the HID lamp for starting the HID lamp.

In an embodiment of the invention, the input power is an AC voltage in a range of about 85V to about 305V at 50 HZ/60 Hz.

In an embodiment of the invention, the input processor further includes an rectifier and filter circuit. In addition, the input processor further includes an electromagnetic wave controller (EMC) for suppressing an electromagnetic wave interference. Moreover, the input processor further includes a negative temperature control (NTC) resistor for suppressing the in-rush current. In addition, the input processor further includes a voltage sensitive resistor (RV) for suppressing the in-rush current. Preferably, the rectifier and filter circuit comprises a diode bridge circuit.

In an embodiment of the invention, the main driver further includes a power factor correction (PFC) circuit connected to the input processor and the protection circuit. In addition, the main driver further comprises a special power supply connected to the input processor, the PFC circuit, the timing circuit and the protection circuit. Moreover, the special power supply comprises at least two circuit paths for supplying power.

In an embodiment of the invention, the main driver further comprises a power driver connected to the input processor, the special power supply, the PFC circuit and the protection circuit. Moreover, the power driver further comprises a light adjuster for adjusting the brightness of the HID lamp by adjusting a frequency of the power driver.

In an embodiment of the invention, the main driver further comprises a half-bridge inverter connected to the input processor and the HID lamp. In addition, the main driver further comprises a half bridge inverter connected to the input processor and the HID lamp.

In an embodiment of the invention, the main driver further comprises a feedback control circuit connected to the PFC circuit, the power drive and the half bridge inverter. Moreover, the starting circuit comprises a sub-starting circuit having a SIDAC connected in series to a diode and an inductor for starting the HID lamp quickly and reliably. In addition, the starting circuit comprises a capacitor connected in parallel to the HID lamp in replacement of the sub-starting circuit when the HID lamp is a metal halide lamp (HML). Moreover, the starting circuit comprises a circuit having a capacitor for fine tuning an output of the HID lamp, a brightness of the HID lamp, and a low-frequency content for controlling an induced sound resonance.

In an embodiment of the invention, the starting circuit comprises a circuit having a thyristor between a capacitor and a resistance for preventing the HID drive from restarting when the HID lamp is on. Moreover, the thyristor is connected to the timing circuit to control a re-starting of the HID lamp by the timing circuit.

In an embodiment of the invention, the main driver comprises a first integrated circuit (IC1) for PFC and for governing preceding filtering and rectification, a second IC (IC2) for power driving, and the timing circuit comprises a third IC (IC3), and when input voltages of the first, second and third ICs are below predetermined values, the second and the third ICs are locked out and the first IC is maintained to be powered and ready for a re-starting.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The embodiments of the present invention provide a solution to the circuit design of the electronic HID driver, the HID driver can also be provided as a HID ballast. The electronic HID ballast can be provided for a low power to middle and high power input, for example but not limited to, the input voltage is in a range of about 85V to about 305V, or up to 1KV. The electronic HID driver is also suitable for a variety of HID lamp, such as a high pressure sodium (HPS) lamp and a metal halide lamp (HML).

Figure 15:
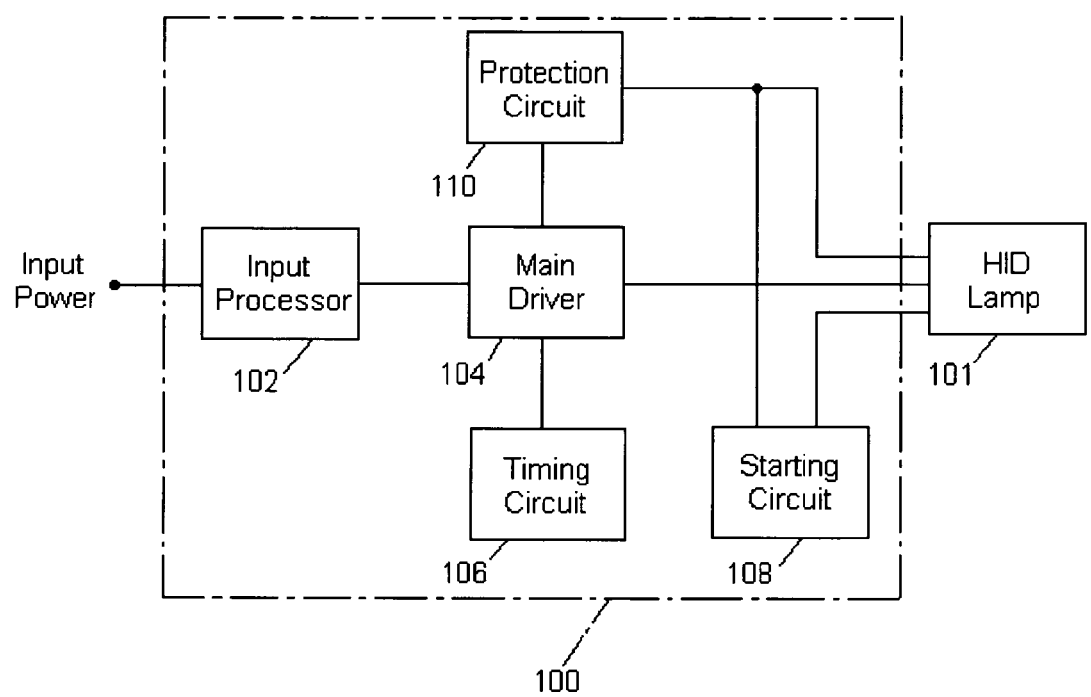
FIG. 15 is a block diagram illustrating a circuit of a high intensity discharge (HID) driver for a HID lamp according to a preferred embodiment of the invention.

FIG. 15 is a block diagram illustrating a circuit of a high intensity discharge (HID) driver for a HID lamp according to a preferred embodiment of the invention. Referring to FIG. 15, a HID driver 100 for driving a HID lamp 101 includes an input processor 102, a main driver 104, a timing circuit 106, a starting circuit 108 and a protection circuit 110. The input processor 102 is connected to an input power and the main driver 104 for suppressing a transient input and an in-rush current of the input power. The main driver 104 is connected to the input processor 102, timing circuit 106, protection circuit 110 and the HID lamp 101 for driving and amplifying the input power. The timing circuit 106 is connected to the main driver 104 and the starting circuit 108 for controlling the timing of starting. The starting circuit 108 is connected to the timing circuit 106, the protection circuit 110 and the HID lamp 101 for providing the HID lamp 101 with quick and reliable starting. The protection circuit 110 is connected to the main driver 104, the timing circuit 106, the starting circuit 108 and the HID lamp 101 for controlling a timing of starting after a power failure or another error condition.

In an embodiment of the invention, the HID driver described above can be provided as a HID ballast. In an embodiment of the invention, the HID lamp includes, for example but not limited to, a high pressure sodium (HPS) lamp or a metal halide lamp (HML).

Figure 16:
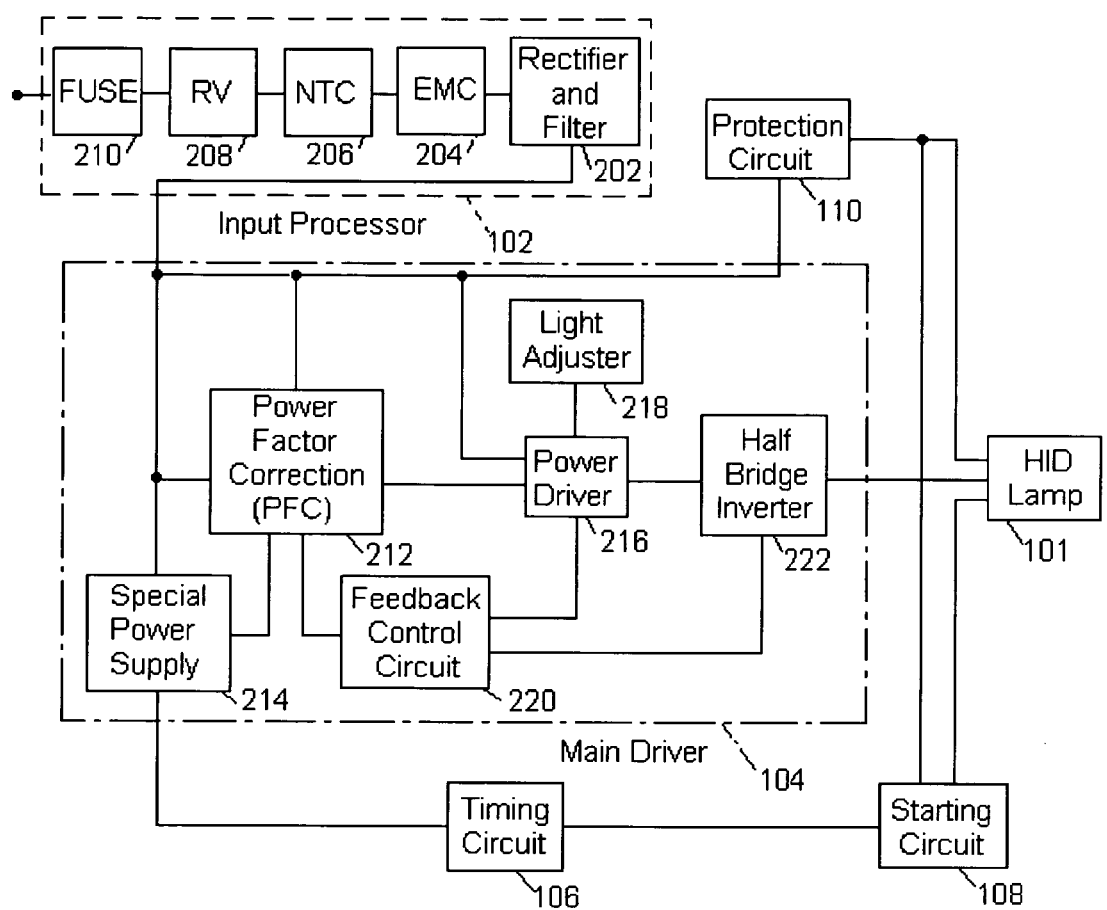
FIG. 16 is a block diagram illustrating a circuit of a HID driver for a HID lamp according to another preferred embodiment of the invention.
Figure 17:
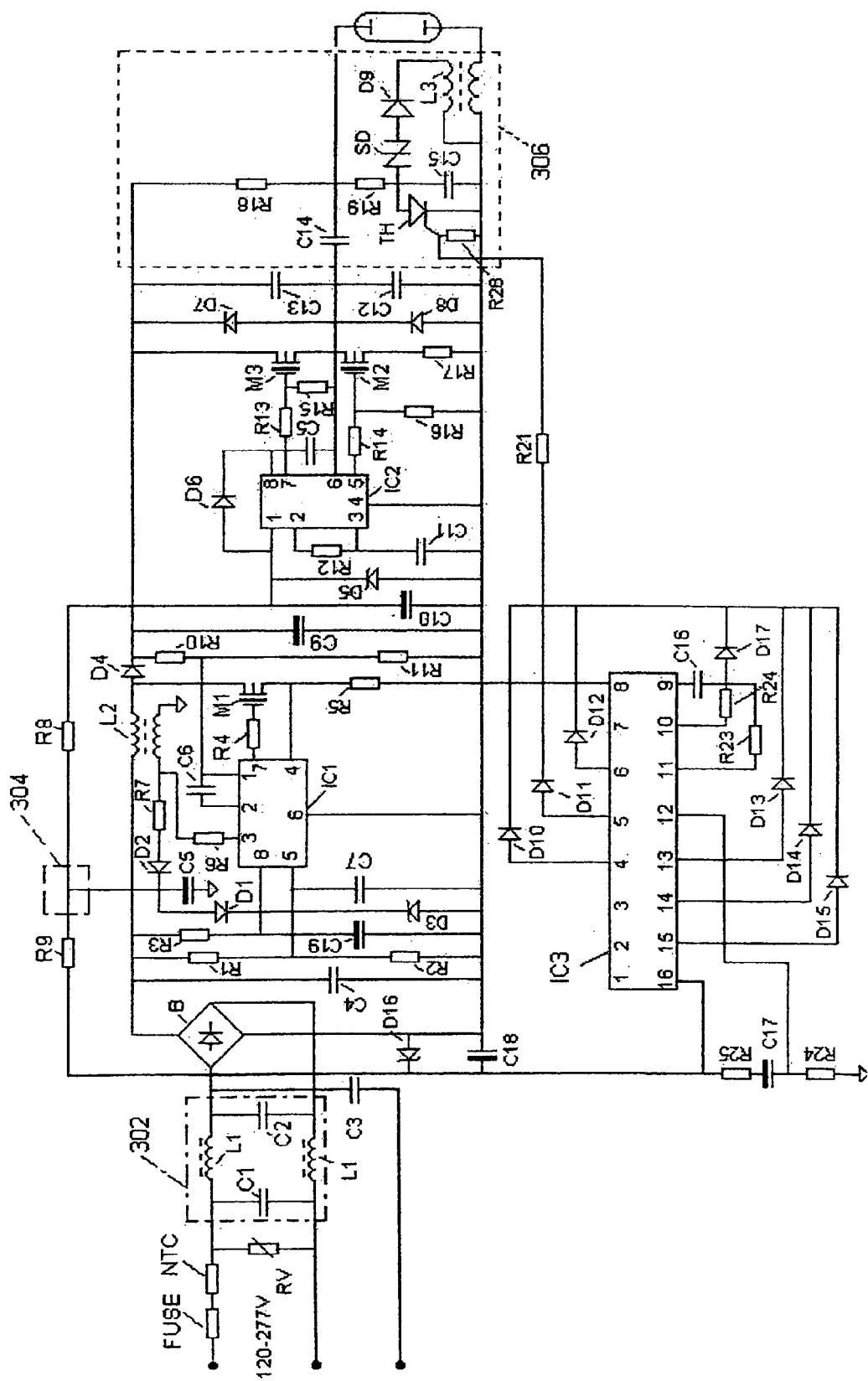
FIG. 17 is a circuit diagram illustrating a circuit of a HID driver for a HID lamp according to a preferred embodiment of the invention.

FIG. 16 is a block diagram illustrating a circuit of a HID driver for a HID lamp according to another preferred embodiment of the invention. FIG. 17 is a circuit diagram illustrating a circuit of a HID driver for a HID lamp according to a preferred embodiment of the invention. FIG. 16 and FIG. 17 may be a more detailed block diagram of a HID driver of FIG. 15 for illustrating the present invention.

Referring to FIG. 16, the input processor 102 further includes, for example but not limited to, one or more circuits selected from the group consisting of an rectifier and filter circuit 202, an electromagnetic wave controller (EMC) 204, a negative temperature control (NTC) resistor 206, a voltage sensitive resistor (RV) 208 and a fuse 210. Referring to FIG. 17, the rectifier and filter circuit 202 includes, for example, a diode bridge circuit, a plurality of resistors, capacitors, and diodes and is provided for filtering and rectification. The electromagnetic wave controller (EMC) 204 is used for suppressing an electromagnetic wave interference including both radio-frequency and conductive-frequency interference.

Referring to FIG. 16, the main driver 104 includes, for example but not limited to, one or more circuits selected from the group consisting of a power factor correction (PFC) circuit 212, a special power supply 214, a power driver 216, a light adjuster 218, a feedback control circuit 220, and a half bridge inverter 222. Thus the main driver 104 can provide power factor correction (PFC) for pre-regulation, driving, power amplification, voltage sampling, and feedback controlling. The power factor correction (PFC) circuit 212 is used for power factor correction and pre-regulation.

In a preferred embodiment of the invention, when the input power is low, the starting circuit 108 may not be necessary for the HID driver. Moreover, the timing circuit 106, for example, including the IC3 or the thyristor TH, may not be necessary for the HID driver.

I. Input Processor

Hereinafter, the input processor 102 will be described in details. For simplifying the description, some parameters such as the voltage, power, etc. is provided but can not be used to limit the scope of the invention. An AC input voltage of 85-305V, 50 Hz/60 Hz is inputted from the power input. The AC input voltage goes though the fuse, the negative temperature control (NTC) resistor and the voltage sensitive resistor (RV) for suppressing the transient over-voltage, the temporary over-voltage and the in-rush current of the AC input. Therefore, the AC input voltage is conditioned. Then the conditioned input voltage is inputted to the block 302 for electromagnetic wave control (EMC), wherein the block 302 may be used as an electromagnetic wave controller (EMC) 204. The circuit of the block 302 is constructed by a pair of capacitors C1 and C2 for suppressing the electromagnetic wave interference, and a pair of inductors, L1 and L1. Accordingly, the input processor 102 is used for conditioning and suppression the transients and in-rush current of the input power. Hereinafter, for the ease of description, it is assumed that the conditioned input voltage is 120V, 60 Hz.

II. Main Driver

A. PFC

After the filtering and rectification processes of the conditioned input voltage, a DC voltage with 120 Hz ripples supply to the primary and the control circuits. First, the voltage is applied to the power factor correction (PFC) circuit 212 to turn on the PFC circuit 212. Thus, the IC1, for example, an integrated circuit for power factor correlation is triggered by the DC voltage. When the IC1 is activated to operate in the normal mode, a stable quasi-DC voltage in a range of about of 385-400V is outputted from the IC1 through the diode D4 and the capacitor C9. The quasi-DC voltage is supplied to the power driver 216 for power amplification. The quasi-DC voltage induced by the primary coil of inductor L2 of the PFC circuit 212, after being filtered and rectified, are applied to the IC2 and the IC3. The IC1 may be constructed by a conventional IC includes, for example but not limited to, L6561 or L6560 of ST, MC34261 or MC34262 of Motorola, TDA 4814 or TDA 4816 of Siemens, UC1852 or UC3852 of TI, SG3562 of Silicon General, KA7524 of Samsung. The IC2 includes, for example but not limited to, L6569 of ST. The IC3 includes, for example but not limited to, HCF4060BE of ST. It is noted that all of the IC1 illustrated above have a limited dynamic range, particularly in a wide input voltage range. For example, in an 120V AC input voltage, the power of the voltage can not exceed 150W. In order to solve the problem, the ST developed the LA981A and the TI developed the UCC3817. However, the disadvantages of the two ICs are that the circuits and the required peripheral circuits of the two ICs are complex, the costs of the two ICs are high and the optimization of the circuits are also complex. Therefore, in the foregoing embodiment of the invention, a circuit using the traditional IC1 to achieved high power factor, low total harmonic distortion (THD), and high power output for wide input voltage range of IC2, the HID driver, is provided. It is noted that one of the functions of IC1 is closely related to preceding the filtering and rectification process.

It is noted that in the design of the electrical HID driver of the HID lamp, one of the key component that is important to the operation of the IC1 is the inductor L2. The inductor L2 is designed corresponding to the input voltage and power, the operating frequency, the magnitude of the ripple current, the suppressing effect to the electromagnetic wave, its location relative to the other circuit component, and the peripheral capacitor connected. Therefore, the basic property of the inductor L2 including, for example but not limited to, the material property and the type of the magnetic core, the number of the coils, the inductance, and the leakage of the magnetic core are all considered in the design of the electrical HID driver. For example, for a HID driver used for a low power loading, the inductor L2 is designed without an air gap. But for a HID driver used for a large power loading or used under a high temperature condition, the inductor L2 is designed with an air gap and a higher capacitance of capacitor connected. Thus, the HID driver can provide a stable high power factor, low total harmonic distortion (THD) and low temperature increasing.

In one preferred embodiment of the invention, the peripheral circuits of the PFC can be fine tuned by special design of the components. For example, to reduce the influence of the parameters obtained from the manufacturing process, a resistance, such as R11, can be divided into two resistors connected in parallel to reduce the uncertainty of the parameters.

B. Power Driver

A key component of the power drive and amplification IC of the power driver is the inductance of the boost inductor. In general, the inductance of the boost inductor is determined by the following equation:

$$L = \frac{Vin(\min) \cdot D}{Irip \cdot F} \quad (11)$$

Wherein Vin(min) is the minimum input voltage, D is the duty cycle, Irip is the inductor ripple current and the F is the switching frequency. It is preferable that the duty cycle D is as large as possible. In the embodiment of the design of the power amplification IC, not only the parameters described in the equation are considered, but also the mutual inference of the parameters is considered. For example, the ripple current is dependent on the stabilization of the working condition during the variation of the voltage, the current value and the activation ability.

Another important component is the capacitance of the power output capacitor, for example, capacitor C9. The capacitance of the capacitor is determined by the following equation:

$$C = \frac{2 \cdot Pout \cdot T}{Vout^2 - Vout(\min)^2} \quad (12)$$

Wherein Pout is the output power, T is the holding time, Vout is the output voltage and Vout(min) is the minimum output voltage. However, the actual case is more complicated. For example, the holding time T is dependent on the frequency and the voltage Vout. Therefore, it is impractical to fine-tune the capacitance of the capacitor. However, it is preferable that to determine the capacitance from a reasonable and reliable range of value. In an embodiment of a 250W HPS and MHL HID driver of the present invention, the capacitance C is, for example but not limited to, 150 μF/450V. In an embodiment of a 400W HPS and MHL HID driver of the present invention, the capacitance C is, for example but not limited to, 220 μF/450V or the capacitance C is a combination of using two capacitors of 470 μF/450V connected in serial. In another embodiment of a 400W HPS HID driver of the present invention, the capacitance C is 150 μF/450V. In actual the 400W HPS HID driver can also work stably but with a higher temperature increment.

It is understood that the current during the starting of a conventional HID driver is large. The large in-rush current during the starting of the HID driver will damage the HID driver and the lamp. Therefore, a NTC is applied to the power input terminals of the HID driver for suppressing the in-rush current. However, it is understood that the performance for suppressing the in-rush current of the NTC is not enough. Thus, in a preferred embodiment of the invention, in addition to the NTC and the RV, a special design is provided for powering IC1, IC2, and IC3 suppressing the in-rush current during the starting period and hence prolonging the useful life of the HID lamp. During the starting period, when the input current is on, IC1 receives input power through the resistor R3, filtering capacitor C4, and diode D3. After the starting period, when IC1 is in its normal operating condition with high power factor (PF), it is mainly the high frequency voltage Vc induced by the primary L2 that supplies IC1 through R7, D2, C5, and D1 and supplies IC2 and IC3 through R8 and R9 respectively. Therefore, in the very beginning during the starting period, R3 is not subject to a large current, and only, for example, a resistance of 2W or less of R3 is enough.

Figure 18:
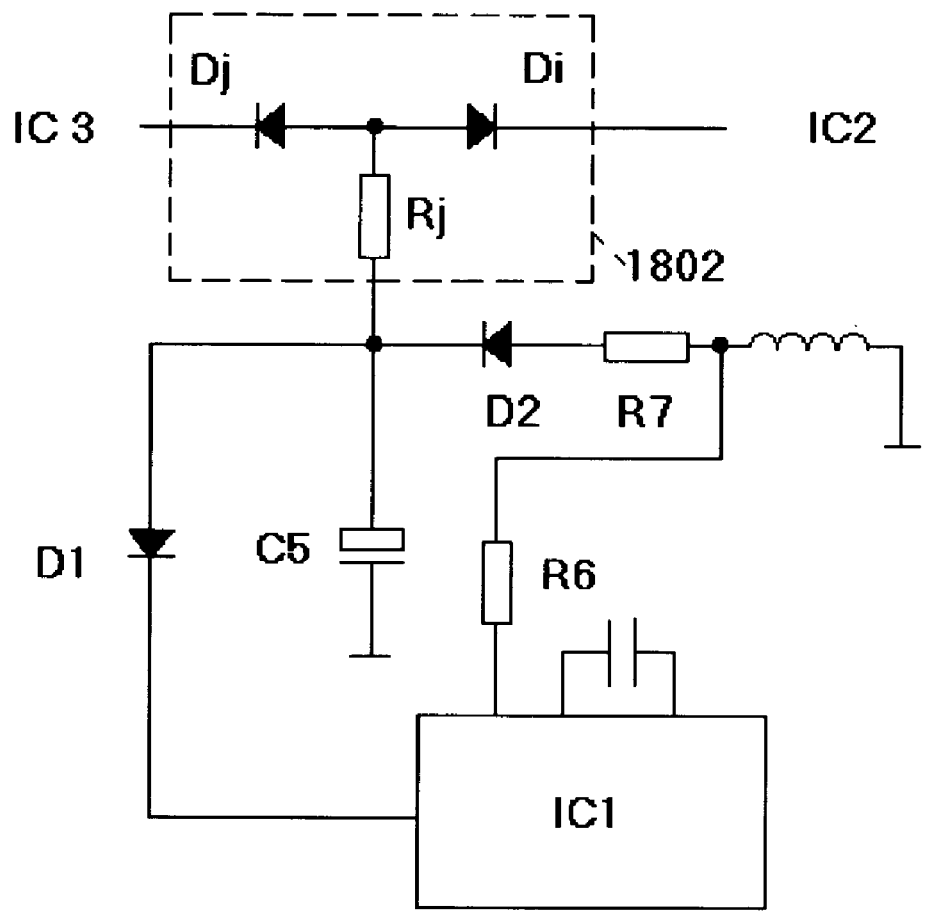
FIG. 18 is a circuit diagram illustrating a power driving circuit of the HID driver according to an embodiment of the invention.

Moreover, the voltage applied to the IC2 of the secondary PWM power IC and the IC3 of the timing circuit is supplied by the voltage Vc induced by the primary L2. Therefore, the primary and the secondary coils of inductor L2 need to be fine-tuned according to each other. Thus, both the number of turns of the primary and the secondary coils of L2, as well as the ratio between the number of turns of the primary and the secondary coils are different from that of the conventional. In addition, it is understood that the internal resistance of the cold lamp (before the lamp is turned on) is much larger than that of the lamp working in the normal condition. Thus, the current of the cold lamp is much smaller than the current of the lamp working in the normal condition. Moreover it is understood that the internal resistance after the lamp is turned off and during the lamp is turned on is larger than that of the lamp working in the normal condition. Therefore, the current of the restarted lamp is also smaller than the current of the lamp working in the normal condition. An alternative design that is equal in performance is shown in FIG. 18, for example, the circuit 304 of FIG. 17 may be replaced by the circuit 1802 of FIG. 18. Therefore, in the embodiment of the invention, it is noted that, from the very beginning of the starting period to the normal operating condition of the lamp, the current inputted is increased gradually to the current of the normal working condition. Thus the life of the HID lamp can be prolonged drastically.

As to the fine tune of IC2, the stabilization of the current supplied by IC1 through R8 and feeds into leg 1 of IC2 will enhance the performance of the boost IC2, accordingly, this current is stabilized by the primary and secondary filtering described above. In an embodiment of the present invention, the resistor R12 connected to the leg 2 and the capacitor C11 connected to the leg 3 of IC2 is used to fine tune the main frequency of IC2. The parameter of the capacitor C12 can be fine tuned from 0.1 µF/50V to 1 µF/50V. The resistors R13, R14, R15 and R16 is used to improve the driving pulse of the output of IC2 at leg 5 and leg 7, thus, the power consumption during switching on and off can be reduced. The main frequency of the IC2 build-in voltage controlled oscillator (VCO) is set by the resistor R12 and capacitor C10.

Accordingly, in the embodiment of the present invention, a larger output power can be obtained under a variety of voltages of working conditions.

Figure 19:
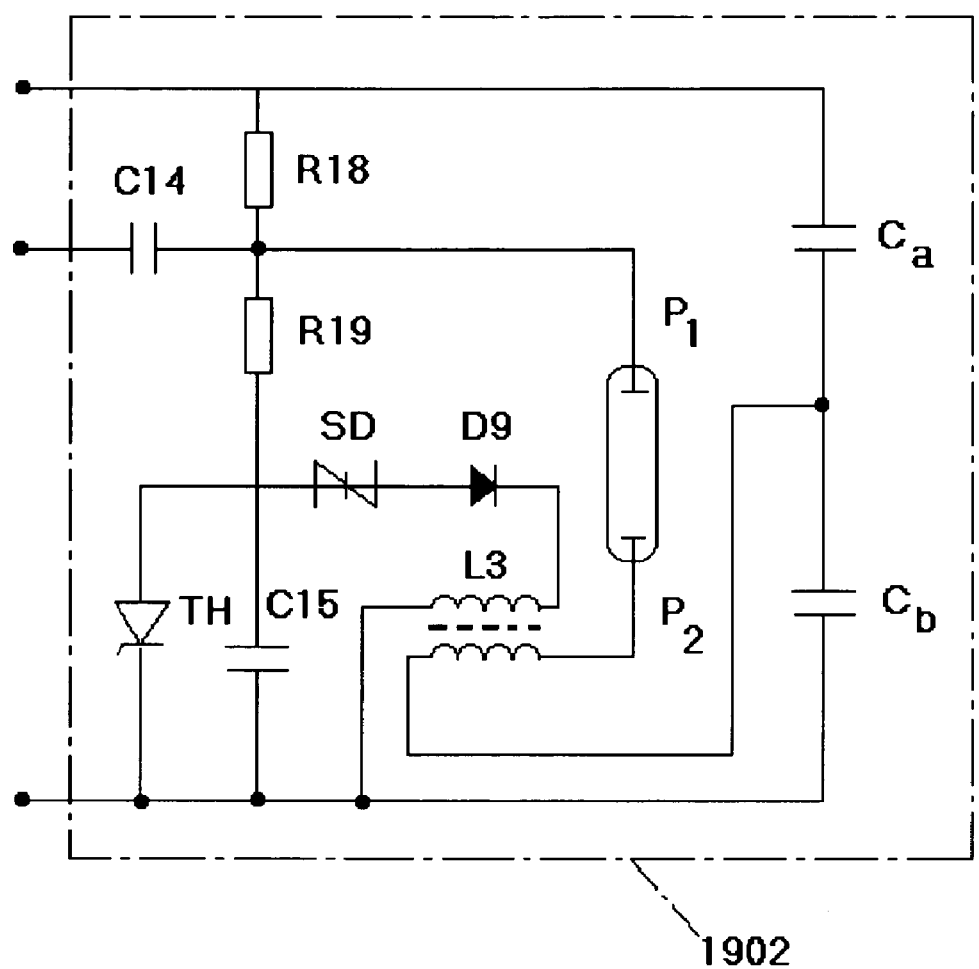
FIG. 19 is a circuit diagram illustrating a starting circuit of the HID driver according to an embodiment of the invention.

If a much higher output power is required, for example, an output power 1KW for a 400W lamp but the inductance of the inductor L3 is maintained, at least 3 methods can be applied. The first method includes, for example, replacing the half bridge power amplifier with a full bridge power amplifier. The second method includes modifying the design of the circuit 306 peripheral to the lamp. For example, for 400W and 1000W HID driver, the circuit 306 can be replaced by the circuit 1902 shown in FIG. 19. Referring to FIG. 19, the terminal P1 of the lamp is still connected to the resistors R18, R19 and the capacitor C14, but the other terminal P2 is connected the capacitors Ca and Cb. Therefore, the total output power is decided by the capacitance of capacitors Ca and Cb. In an embodiment of the invention, for a 40W HID driver shown in FIG. 17, when the circuit 306 is replaced by the circuit 1902 but without changing the same components of both figures, the output power of the HID driver can be enhanced to about 70W.

The third method includes adjusting the capacitance of the capacitor C15. In one embodiment of the invention, the capacitance is about 1 µF/400V. When the capacitance of the capacitor C15 is decreased, the output power is increased, and vice versa. It is important that the capacitance of the capacitor C15 can not be too small, otherwise the low frequency components of the output voltage will be decreased and the opportunity of generating the sound resonance will be increased.

C. Light Adjuster

Referring to FIG. 16, a light adjuster 218 can be connected to the power driver 216, wherein the IC2 of the power driver 216 can also be used to adjust the brightness of the HID lamp by adjusting the frequency. In an embodiment of the present invention, the main frequency of IC2 is adjusted from the leg 2 and the leg 3 of IC2. Referring to FIG. 17, for example, the resistor R12 is connected in between the leg 2 and the leg 3 of IC2, and the capacitor C11 is connected to the leg 3 of IC2 to fine tune the main frequency of IC2. In the embodiment of the invention, the frequency can be determined by the following equation:

$$f = \frac{1}{1.4 \cdot R \cdot C} \tag{13}$$

It is noted that when the resistance R increase, the frequency f will decrease, therefore the impedance ωL of the inductor L3 will decrease and the current of the lamp will increase, thus the brightness of the lamp will increase, and vice versa. In an embodiment of the invention, the resistance of the resistor R12 is preferably in a range of about 20KΩ to about 56KΩ. It is preferable that the light adjuster 218 is provided for a HID driver without an extremely large power output, and the length of the wire connected between the light adjuster 218 and the IC2 is as short as possible, otherwise the frequency will cause the sound resonance.

D. Feedback Control Circuit

The MOSFET M1, M2 and M3 source resistor detect the current passing through M1 and the power switch respectively and feedback simultaneously to adjust the operations of the PFC 212, the power switch circuit and the timing circuit 106.

III. Timing Circuit

Although current invention, like some existing design, uses HCF 4060 (IC3) for controlling the timing of the starting voltage pulse, its circuit structure and performance is much simpler, more effective, and reliable.

IV. Starting Circuit

The present invention provides a novel and unique design of the starting circuit that can provide the HID driver with quick and reliable starting. In general, during the working period of the HID electrical HID driver, a high voltage pulse must be provided to the HID lamp to discharge the gas. There are at least two types of starting circuits to provide the high voltage pulse. One starting circuit is provided by using the harmonic oscillation of the circuit, and the other is provided by using the bi-directional thyristor diodes (SI-DAC). Accordingly, a starting circuit using the SIDAC is preferable since the amplitude and the width of the pulse obtained from the circuit is much easier to be controlled. Thus, a high voltage pulse for sufficiently starting the cold lamp and hardly restarting for the hot lamp can be provided.

Referring to FIG. 17, in an embodiment of the invention, the starting circuit includes at least, for example but not limited to, a SIDAC connected in series to a diode D9 and the inductor L3. The diode D9 is not only used to ensure the single-direction of the current for charge and discharge, but also to prevent for the possibility of oscillation. Therefore, by adjusting the value and the period of the current simultaneously, the amplitude and the width of the high voltage pulse can be adjusted indirectly. When the capacitance of the charge capacitor C15 is also adjusted, the amplitude and the width of the high voltage pulse can be adjusted directly.

In another embodiment of the invention, a thyristor TH is connected to the capacitor C15, the SIDAC and the resistor R20. Therefore, when the control pole (gate) of the thyristor TH is at low voltage, both the thyristor TH and SIDAC are all in down condition, and the capacitor C15 is charged through the resistors R18 and R19. When the voltage across the capacitor C15 exceeds the collapse voltage $V_{BO}$ of SIDAC, the SIDAC is turn on while the thyristor is remained off; the capacitor C15 is subsequently discharged and a current through SIDAC, diode D9, inductor L3 is generated. Since the period of the generated current is very short, the current will induce a series of high voltage pulses, and the amplitude and the width of the high voltage pulse is dependent on the value and the period the current. Therefore, the high voltage pulse is determined by the capacitor C15 and the diode D9. After an extremely short period of time (by then the lamp is already turned on), the IC3 of the timing circuit 106 sends through R21 a voltage pulse (about 2V) to the control pole of the thyristor TH and turns the thyristor TH on. Therefore, the charge remains on the capacitor C15 will be discharged and the generating of the high voltage pulses will be terminated, thus the HID lamp can work normally and stably. Accordingly, in an embodiment of the invention, the starting circuit is constructed by resistors R19, R18, capacitor C16, diode D9, SIDAC and inductor L3.

Figure 1:
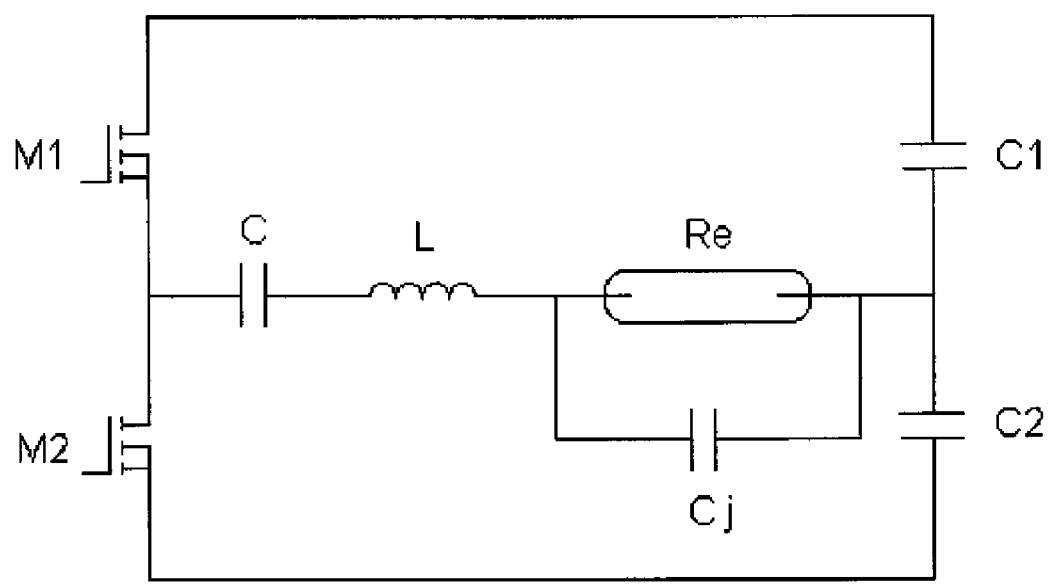
FIG. 1 is a circuit diagram illustrating a conventional electronic HID ballast using a half bridge/full bridge switching power supply
Figure 2:
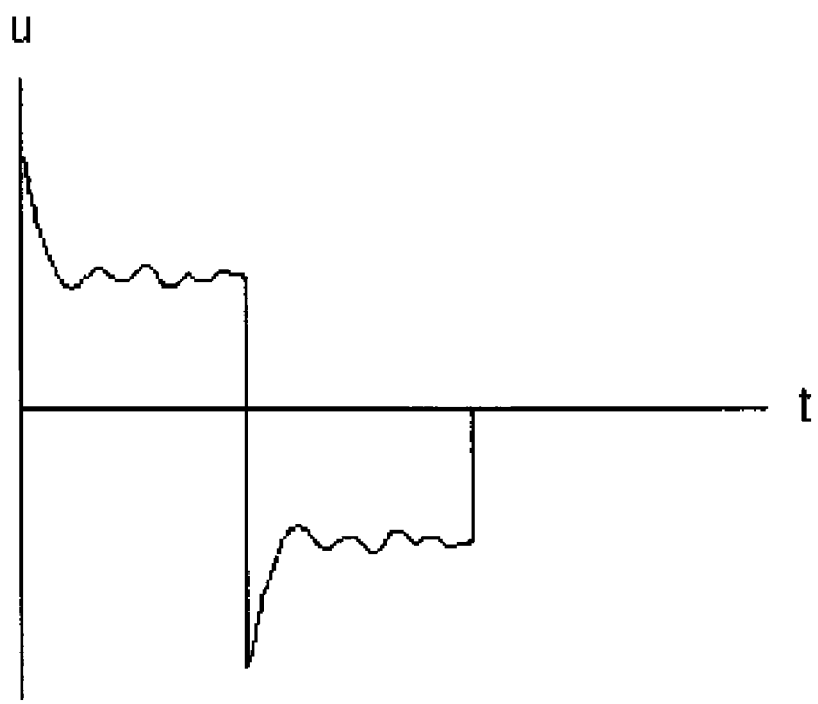
FIG. 2 is a waveform diagram illustrating a quasi-square wave having an over-pulse peak as a trigger pulse of the HID lamp.
Figure 3:
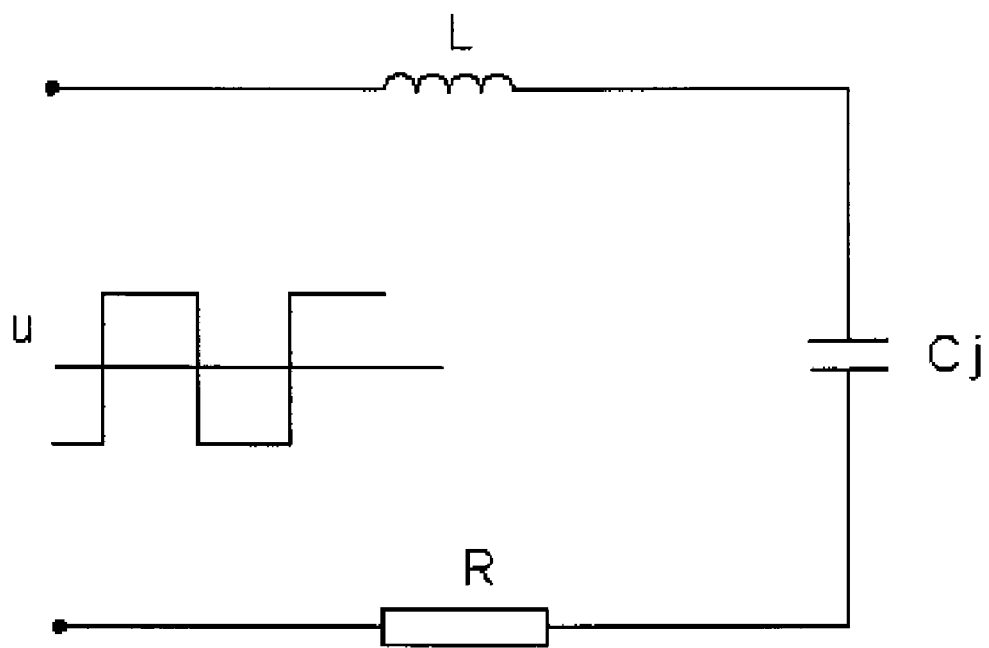
FIG. 3 is a circuit diagram for simulating the circuit diagram shown in FIG. 1.
Figure 4:
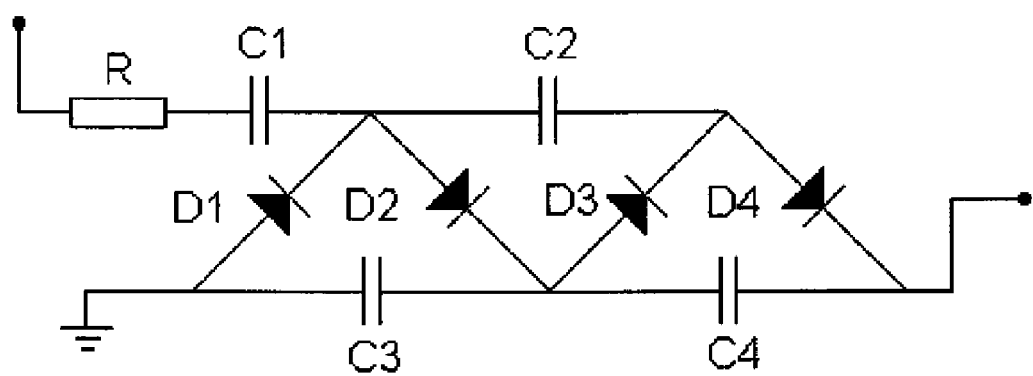
FIG. 4 is a circuit diagram illustrating a conventional starting circuits for triggering the HID lamp of 4 times of voltage type.
Figure 5:
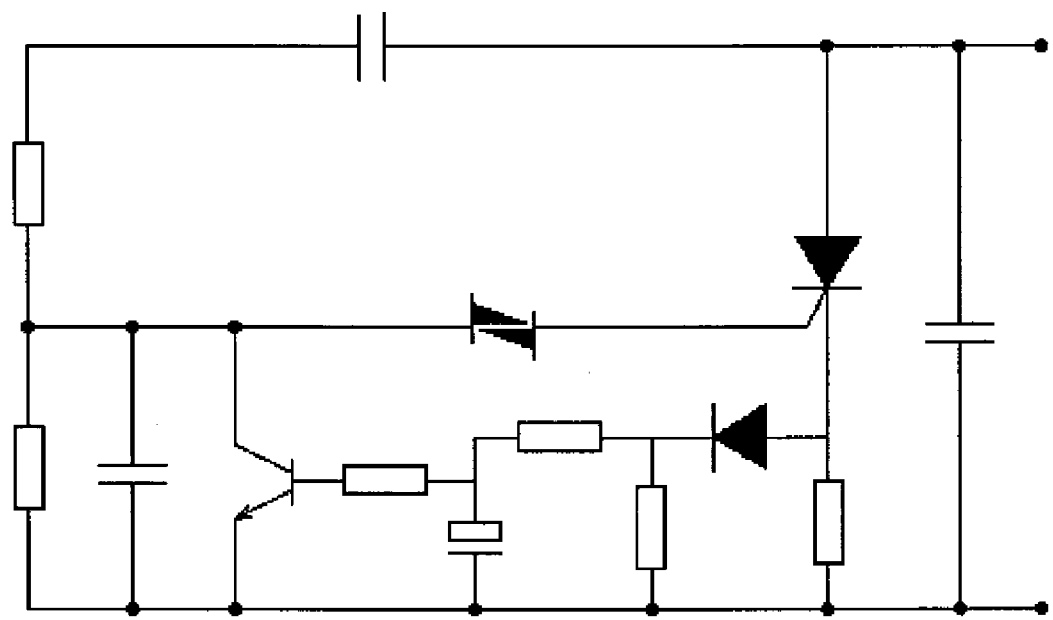
FIG. 5 is a circuit diagram illustrating another conventional starting circuits for triggering the HID lamp.
Figure 6:
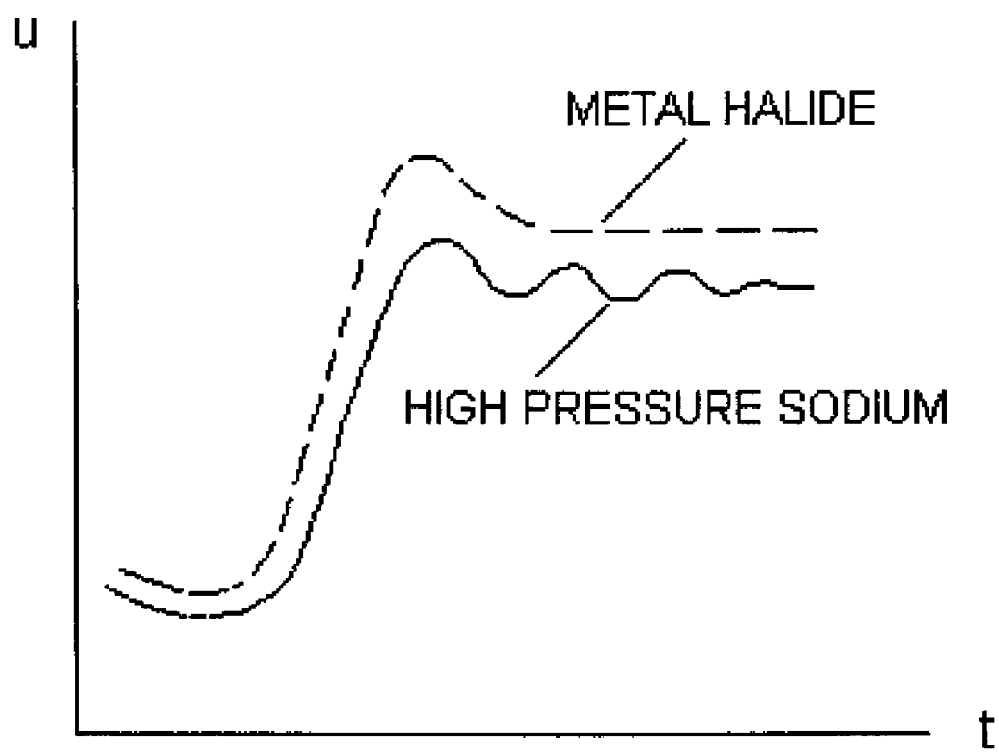
FIG. 6 is a diagram illustrating the voltage curve from the starting to the stable working period of a conventional HID lamp.
Figure 7:
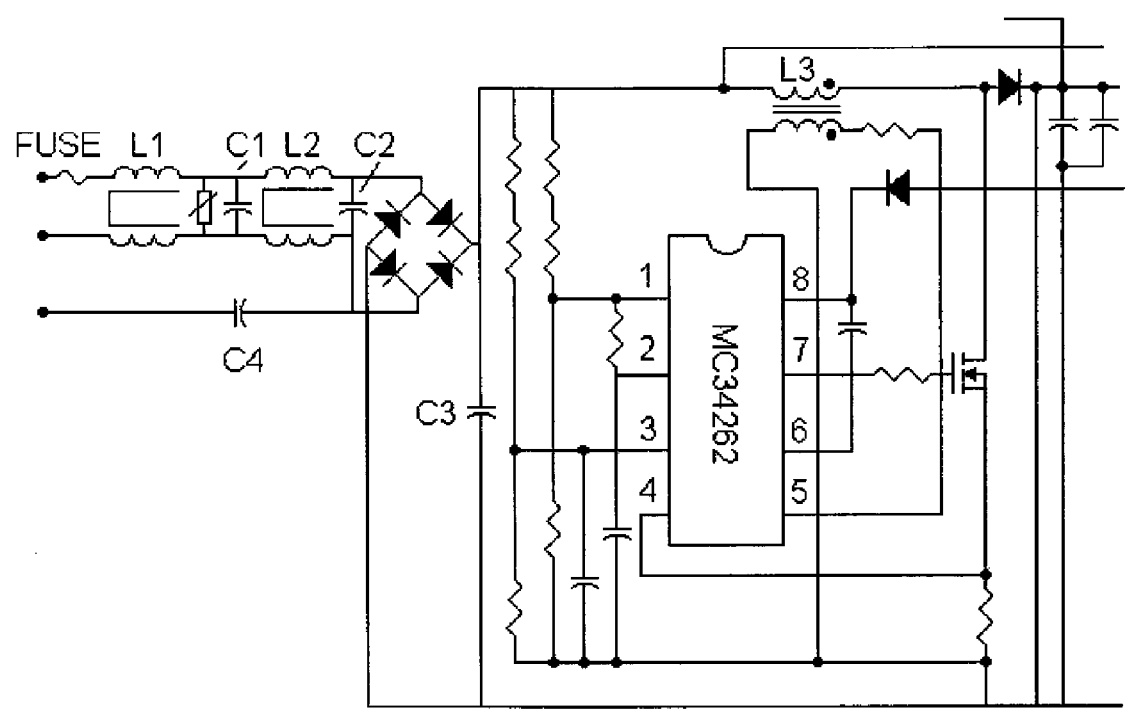
FIG. 7 is a block diagram illustrating the circuit of MC34262 of Motorola.
Figure 8:
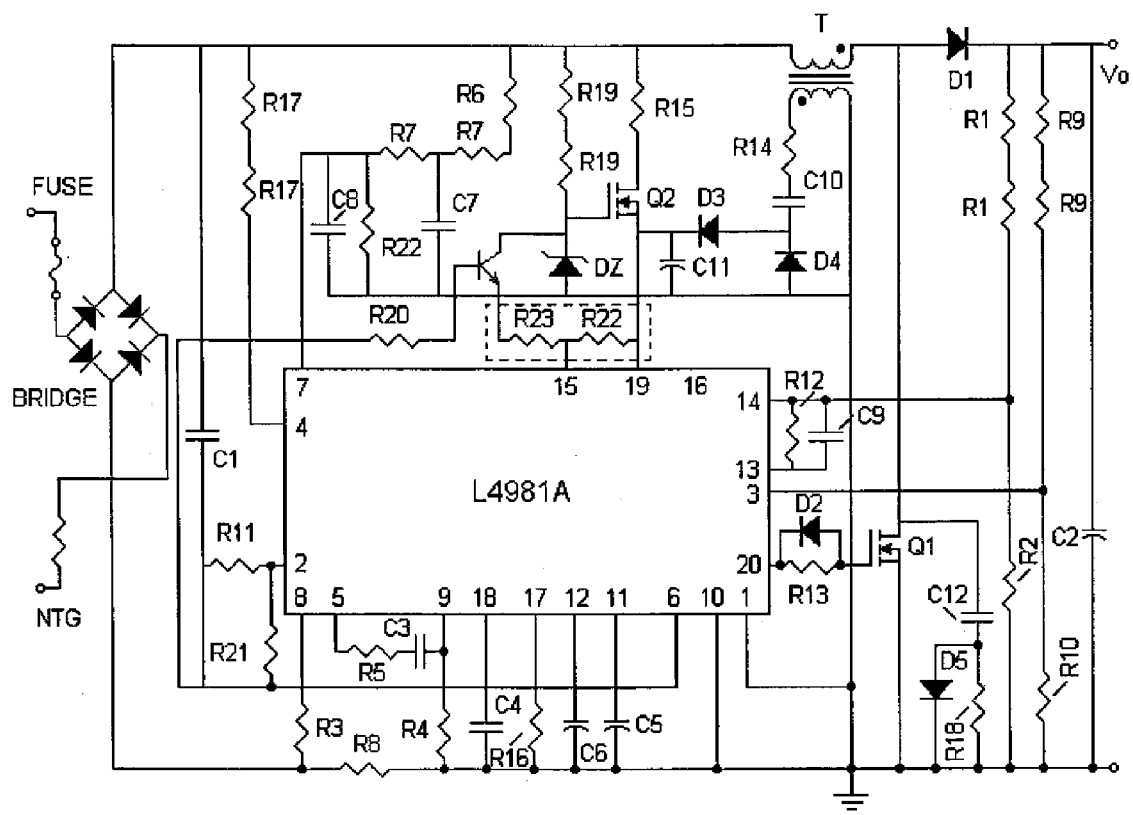
FIG. 8 is a block diagram illustrating the circuit of L4981A of ST.
Figure 9:
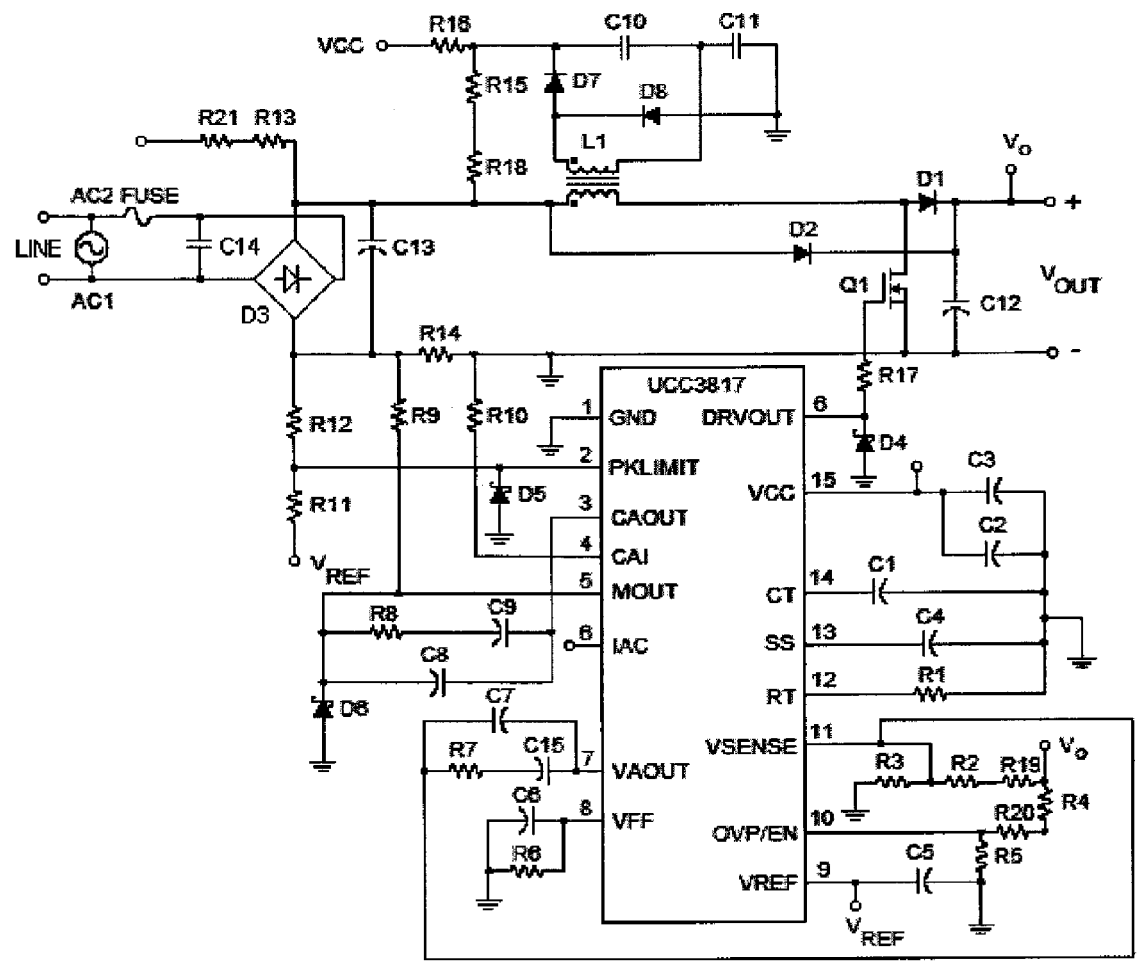
FIG. 9 is a block diagram illustrating the UCC3817 of Texas Instrument (TI)
Figure 10:
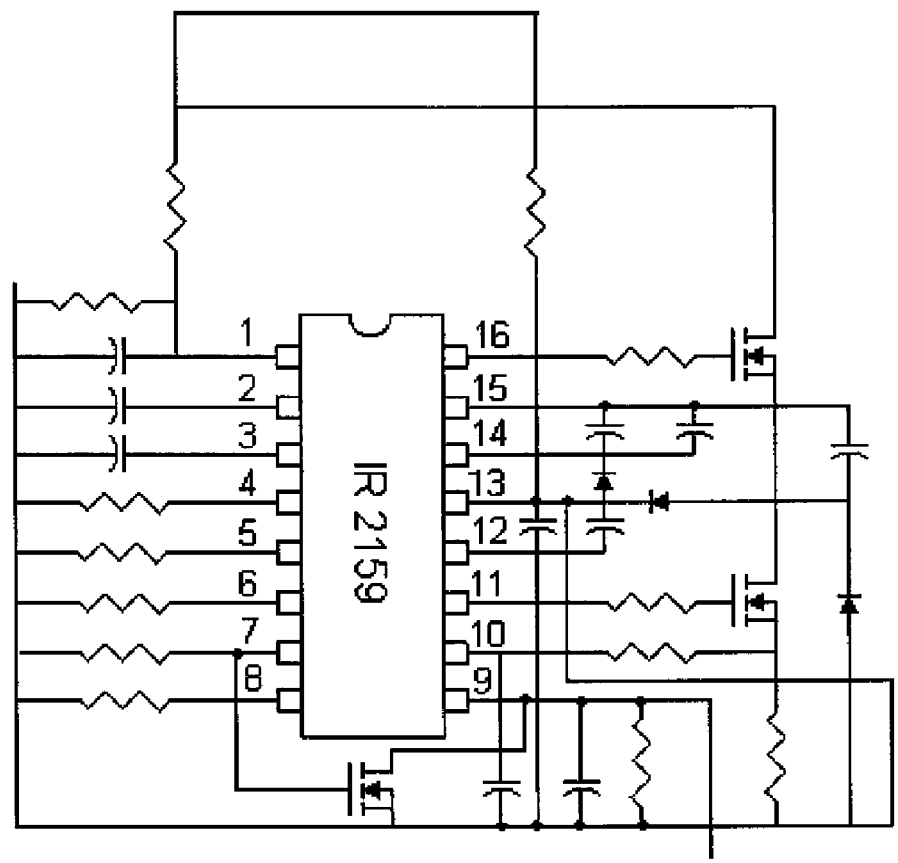
FIG. 10 is a block diagram illustrating the circuit of L2155, L2156 or L2159 of IR.
Figure 11:
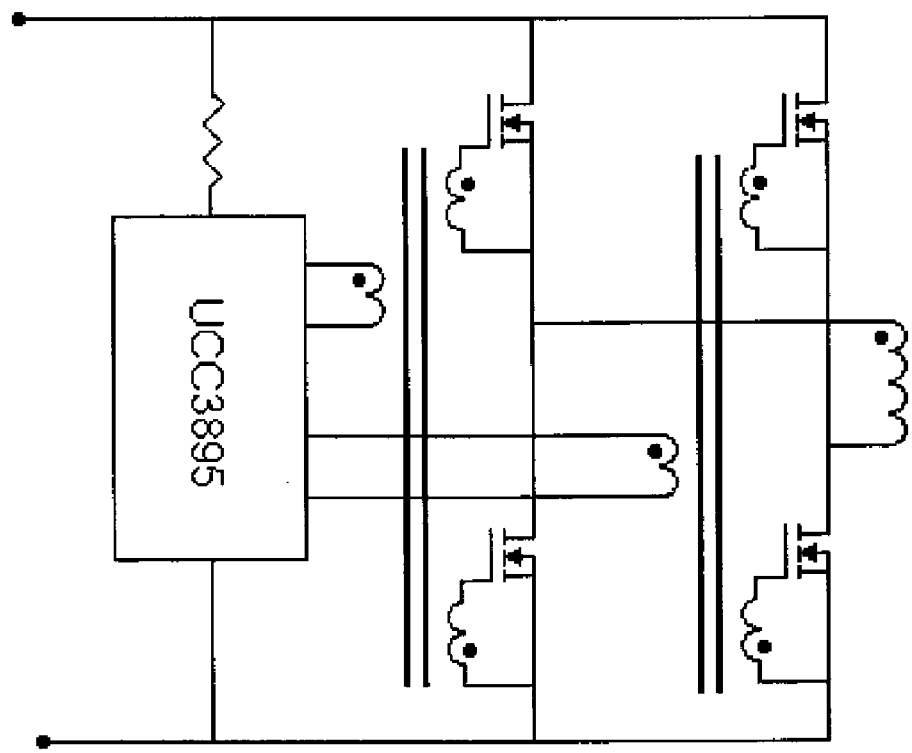
FIG. 11 is a block diagram illustrating the circuit of UCC3580 or 3895 of TI.
Figure 12:
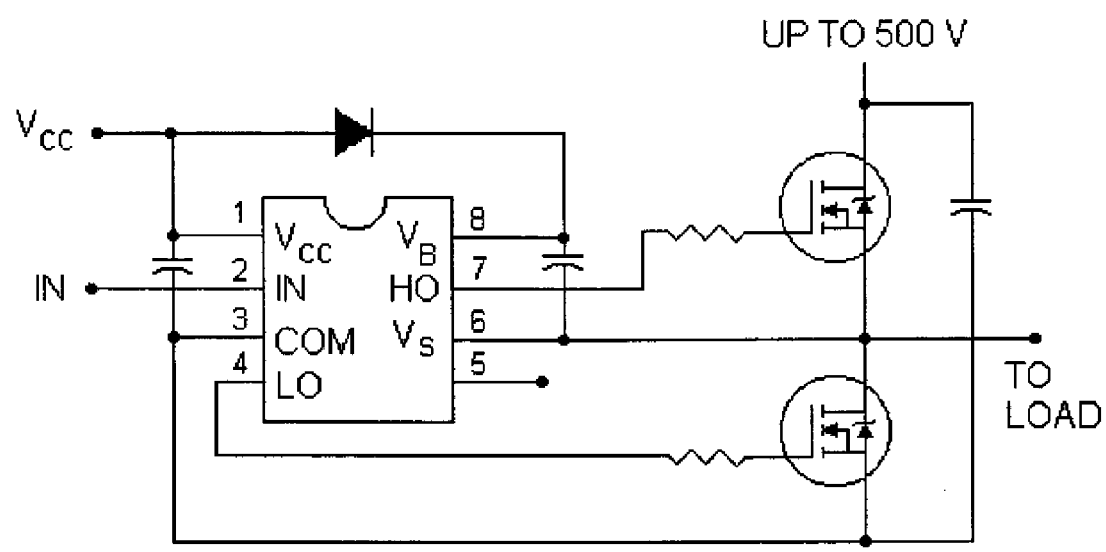
FIG. 12 is a block diagram illustrating a circuit of a conventional power drive circuit.
Figure 13:
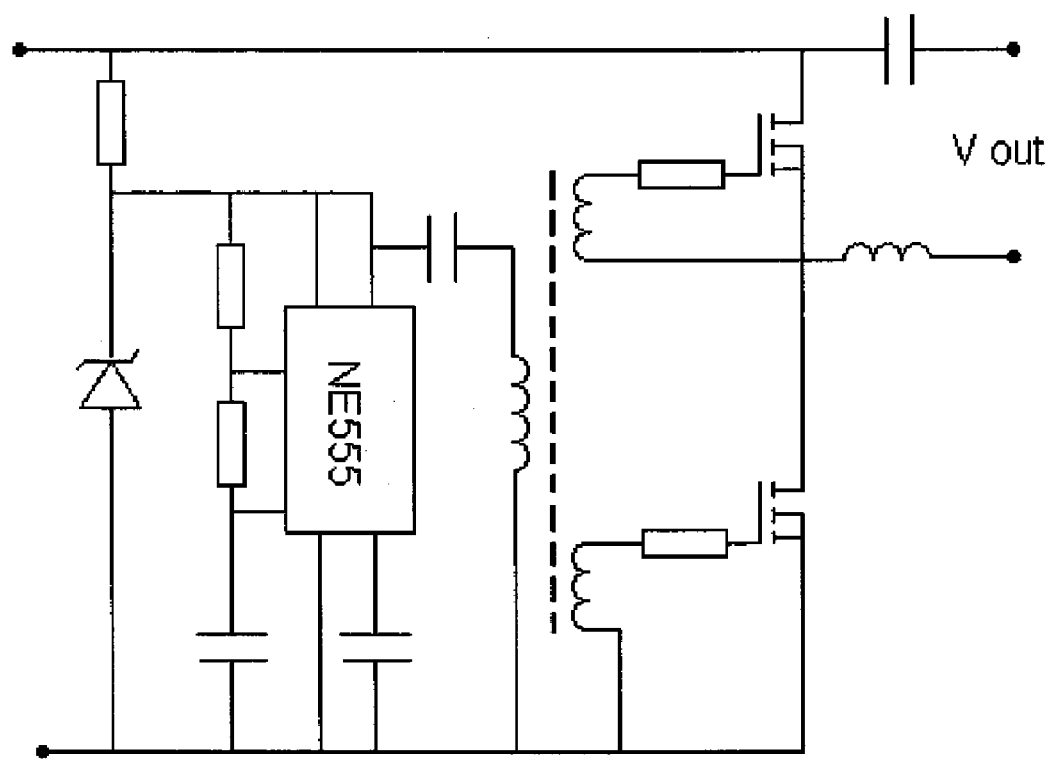
FIG. 13 is a block diagram illustrating another circuit of a conventional power drive circuit.
Figure 14:
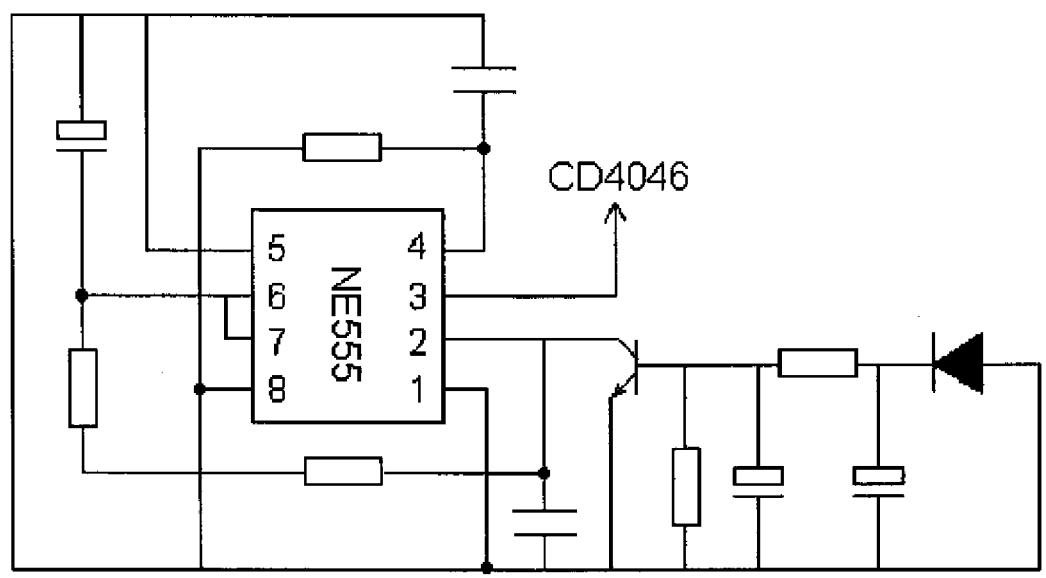
FIG. 14 is a block diagram illustrating a conventional protection circuit.
Figure 20:
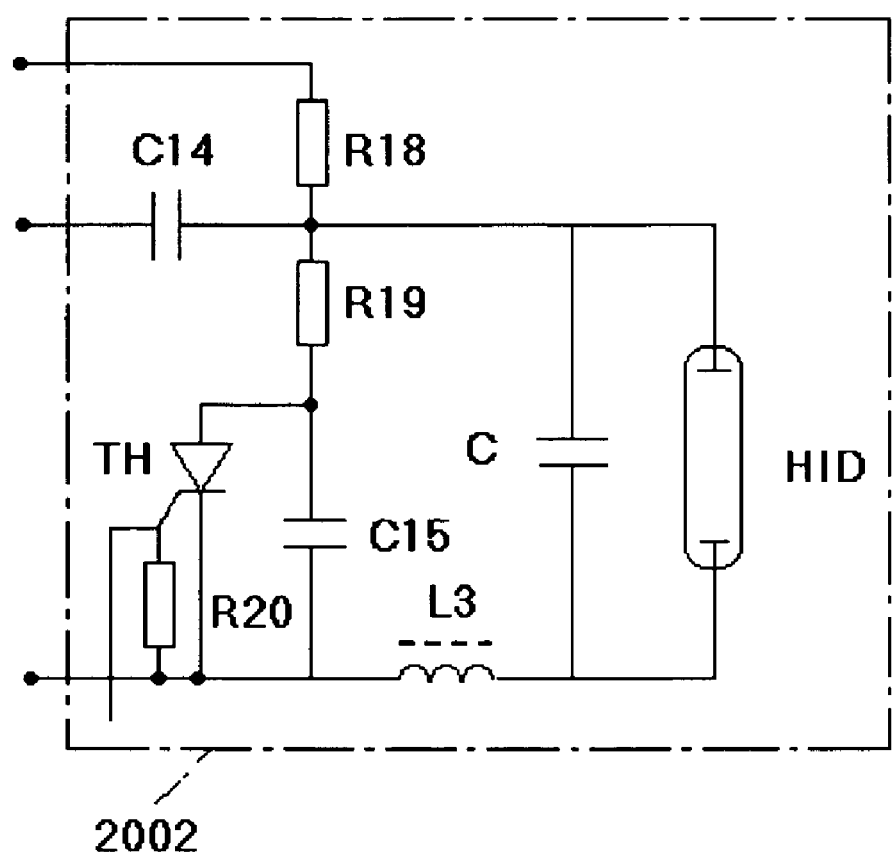
FIG. 20 is a circuit diagram illustrating a starting circuit of the HID driver according to an embodiment of the invention.
Figure 21:
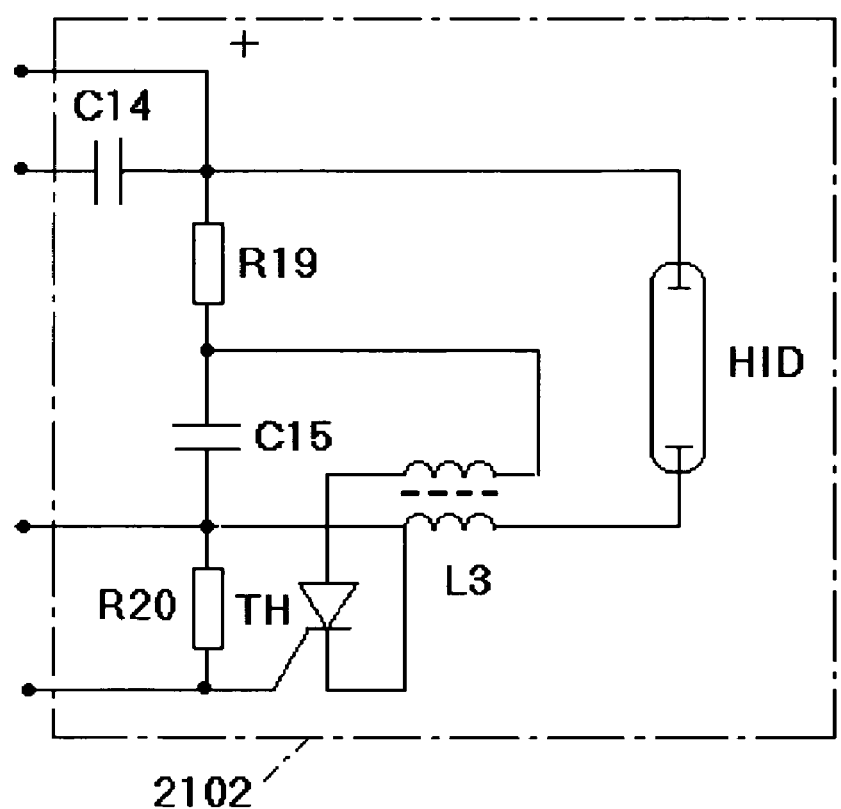
FIGS. 21 to 24 are circuit diagrams illustrating starting circuits of the HID driver according to embodiments of the invention.
Figure 22:
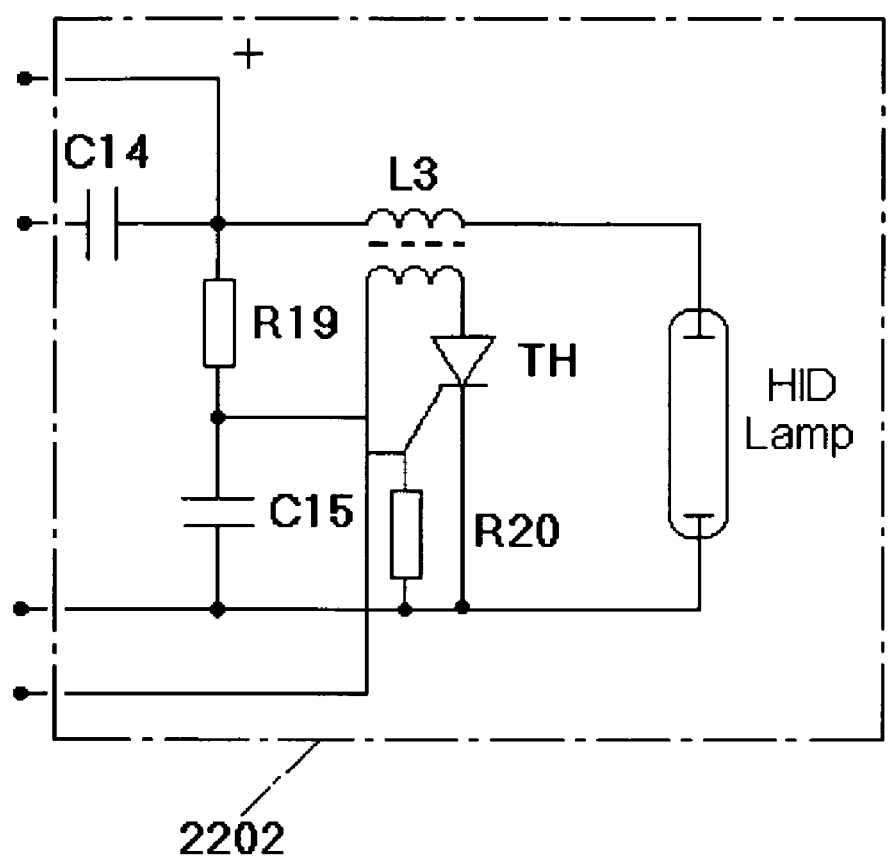
Figure 23:
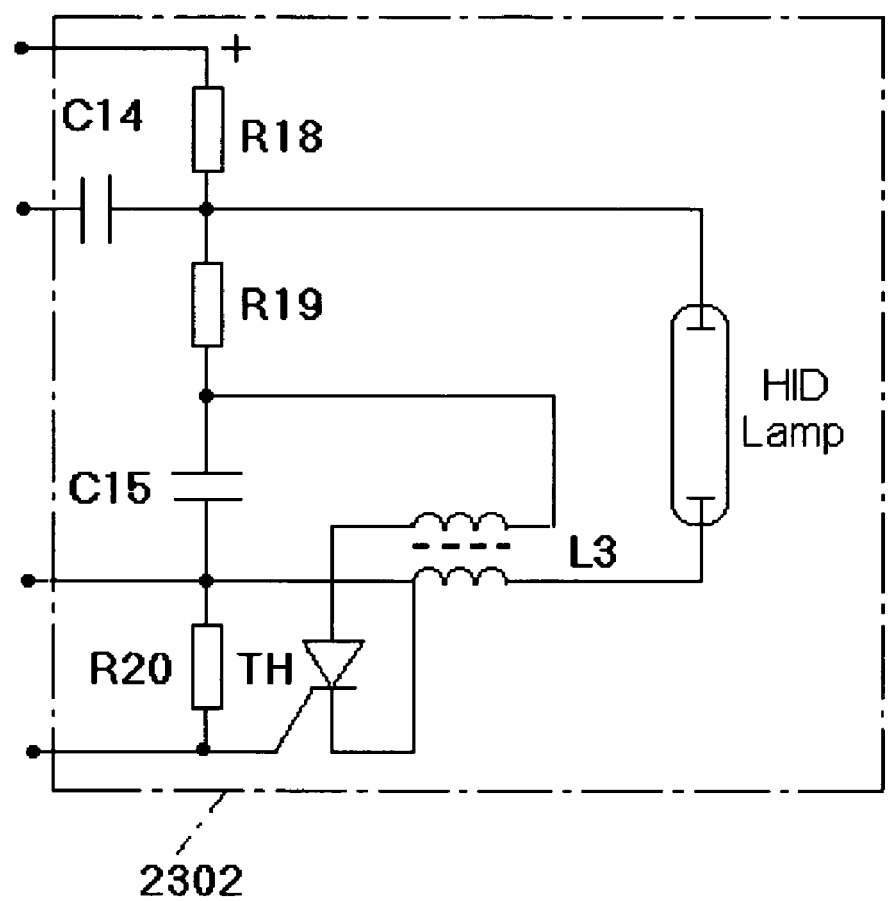
Figure 24:
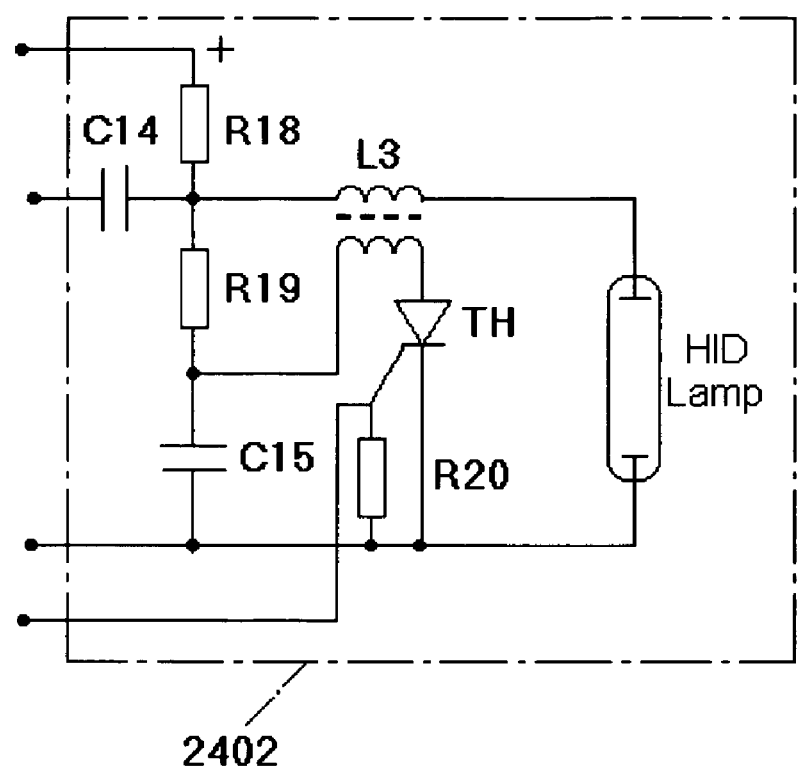

Accordingly, the embodiment of the invention using the SIDAC as a starting circuit is preferably provided for the HPS lamp. For a starting circuit of the meal halide lamp (MHL), the foregoing embodiment can also start the HML. However, referring to FIG. 6, since the tube voltage and the starting voltage of the HML is larger than that of the HPS lamp, the circuit 306 of FIG. 17 may be replaced by the circuit 2002 of FIG. 20. Referring to FIG. 20 the starting coil of inductor L3, the SIDAC, and D9 are eliminated and a capacitor is connected in parallel to the lamp.

Hereinafter, some embodiments of the starting circuits 108 of the present invention are provided. FIGS. 21 to 24 are circuit diagrams illustrating starting circuits of the HID driver according to embodiments of the invention. In the embodiments of the invention, the circuit 306 of FIG. 17 can be replaced by any one of the circuits 2102, 2202, 2302, and 2402 of FIGS. 21, 22, 23 and 24 respectively. The circuits 2102, 2202, 2302, 2402 and the circuit 306 substantially have the same performance. Referring to FIGS, 21, 22, 23 and 24, after the power of the HID driver is on, the thyristor TH is off as its control pole is at low voltage. The current going through resistor R19 or resistors R18 and R19 will charge capacitor C15. After a short while, the IC3 of the timing circuit 106 sends a pulse, for example, greater that 2V, to the gate of thyristor TH and turn on the thyristor TH. The capacitor C15 then discharges to inductor L3 and start the lamp. Once the lamp is on, since thyristor TH is still on, the capacitor C15 can no longer be charged, and thus no more pulse will be generated.

V. Protection Circuit

The present invention provides a novel and unique design of the protection circuit that is simple and effective. Although IC1 and IC2 does not have any special protection function, however, the property of IC1, IC2, even though IC3 can be provided for the construction of the protection circuit. In the discussion of the main driver 104, it is noted that during the beginning of the starting of the lamp, the power of IC1 is supplied through resistor R3 and capacitor C4. When IC1 is in high power working state, the power of IC1 is supplied through the rectification, filtering and stabilization by resistor R7, diode D2, capacitor C5 and diode D1 from the induced voltage of the primary coil of inductor L2. The power is supplied through resistors R8 and R9 to the PWM power driver IC2 and the timing circuit IC3 respectively.

Accordingly, the resistors R7, R8, and R9 can be used to control the power supplies to IC1, IC2, and IC3. Therefore, in an embodiment of the invention, the design of the current protection circuit is based on the feature that, when the voltage of the power supplies to IC1, IC2, and IC3 drop to below a certain voltage, the IC1, IC2 and IC3 will get into a lockout condition.

In an embodiment of the invention, when the lamp is in abnormal condition such as power failure, poor contact, broken lamp, etc, the output voltage of the HID driver will also drop. Consequently, the output voltage of the secondary and hence that of the primary coil will drop, causing IC2 and IC3 lockout. Since IC1 is still powered by current through resistor R3, capacitor C6, and diode D3, the IC1 gets into a condition that it can not be started. Therefore, the HID driver system is under the protection condition. The power consumption of the HID driver is thus reduced to a range of about 5W to about 10W, or even less than 5W that is only a fraction of 250W. When the circuit is set into a normal condition, due to the limitation of the timing circuit, the HID driver will be restarted after about 5 minutes, and then the lamp will be turned on to the normal working state. Moreover, the invention can also provide a preferable power consumption that supplies a sufficient large starting power and a low power in protection mode. For example, the capacitor C6 can be adjusted to determine the power consumption.

Moreover, in an embodiment of the invention, the mechanism that prevents the HID driver from stating after the HID lamp is turned on can also be provided as protection circuit. For example, referring to FIG. 17, after the lamp is turned on, the timing circuit provides a starting pulse through resistor R21 to the control pole of the thyristor TH and thus the thyristor TH is turned on. Therefore, the charge remains on the capacitor C15 will be discharged and the charging and discharging process of the capacitor C15 including the generating of the high voltage pulses will be terminated until the next restarting period. Accordingly, the HID lamp can work normally and stably by the protection of the mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

It should be noted that IC1, IC2 and IC3 are all chosen from commonly available integrated circuits. All the chosen integrated circuits do not possess special protection circuit respectively. Therefore, in order to provide protection, the present invention provides a special structure as described herein. IC1 initially receives input voltage from the bridge rectifier through R3 and C4. Once IC1 is in normal operating state, its input voltage is supplied by the primary coil of L2, which also supplies the input voltage to IC2 and IC3 as well.

When abnormal conditions such as excessive voltage or current surge occur, feedback current through R5 and R17, IC1 quickly enter into a low power state and hence lower the induced voltage output from L2. As a result, IC2 and IC3, along with IC1 achieve a lockout state. Furthermore, only after IC1 gets into normal operating state, will IC2 and IC3 receive appropriate input voltage. Therefore, in conjunction with the NTC the above described features effectively suppresses the rush current.

What is claimed is:

1. A high intensity discharge (HID) driver for a HID lamp, comprising:
    an input processor connected to an input power for suppressing a transient and an in-rush current of the input power;
    a main driver connected to the input processor and a HID lamp for driving and amplifying the input power;
    a protection circuit connected to the main driver and the HID lamp for controlling a timing of starting after a failure condition; and
    a timing circuit connected to the main driver for controlling a timing;
    wherein, when a voltage or current surge occurs, feedback current flowing via a resistance of a primary coil within said protection circuit drops causing a lower power state to occur within the timing circuit to lower and induce a voltage output.

2. The HID driver of claim 1, wherein the HID driver comprises a HID ballast.

3. The HID driver of claim 1, wherein the HID lamp comprises a high pressure sodium (HPS) lamp or a metal halide lamp (HML).

4. The HID driver of claim 1, wherein the input power is an alternating current (AC) voltage in a range of about 85V to about 305V at 50 HZ[/60 HZ].

5. The HID driver of claim 1, wherein the HID driver further comprises:
    a starting circuit connected to the timing circuit and the HID lamp for starting the HID lamp.

6. The HID driver of claim 5, wherein the HID driver comprises a HID ballast.

7. The HID driver of claim 5, wherein the HID lamp comprises a high pressure sodium (HPS) lamp or a metal halide lamp (HML).

8. The HID driver of claim 5, wherein the input power is an alternating current (AC) voltage in a range of about 85V to about 305v at 50 HZ[/60 HZ].

9. The HID driver of claim 5, wherein the input power is an alternating current (AC) voltage in a range of about 85V to about 1KV at 50 HZ/[60 HZ].

10. The HID driver of claim 5, wherein the input processor further comprises an rectifier and filter circuit.

11. The HID driver of claim 5, wherein the input processor further comprises an electromagnetic wave controller (EMC) for suppressing an electromagnetic wave interference.

12. The HID driver of claim 5, wherein the input processor further comprises a negative temperature control (NTC) resistor for suppressing the in-rush current.

13. The HID driver of claim 5, wherein the input processor further comprises a voltage sensitive resistor (RV) for suppressing the in-rush current.

14. The HID driver of claim 5, wherein the rectifier and filter circuit comprises a diode bridge circuit.

15. The HID driver of claim 5, wherein the main driver further comprises a power factor correction (PFC) circuit connected to the input processor and the protection circuit.

16. The HID driver of claim 5, wherein the main driver further comprises a special power supply connected to the input processor, and PFC circuit, the timing circuit and the protection circuit.

17. The HID driver of claim 16, wherein the special power supply comprises at least two circuit paths for supplying power.

18. The HID driver of claim 5, wherein the main driver further comprises a power driver connected to the input processor, a special power supply, a PFC circuit and the protection circuit.

19. The HID driver of claim 18, wherein the power driver further comprise a light adjuster for adjusting the brightness of the HIP lamp by adjusting a frequency of the power driver.

20. The HID driver of claim 5, wherein the main driver further comprises a half bridge inverter connected to the input processor and the HID lamp.

21. The HID driver of claim 5, wherein the starting circuit comprises a capacitor connected in parallel to the HID lamp in replacement of the sub-starting circuit when the HID lamp is metal halide lamp (HML).

22. The HID driver of claim 1, wherein the input power is an alternating current (AC) voltage in the range of about 85V to about 305V at 60 HZ.

23. The HID driver of claim 5, wherein the input power is an alternating current (AC) voltage in a range of about 85V to about 305V at 60 HZ.

24. The HID driver of claim 5, wherein input power is an alternating current (AC) voltage in a range of about 85V to about 1KV at 60 HZ.

* * * * *